(12) United States Patent
Kanke et al.

(10) Patent No.: US 7,328,762 B2
(45) Date of Patent: Feb. 12, 2008

(54) ELECTRIC VEHICLE

(75) Inventors: Hiroo Kanke, Wako (JP); Tsutomu Inui, Wako (JP)

(73) Assignee: Honda Motor Co., Ltd. (JP)

( * ) Notice: Subject to any disclaimer, the term of this patent is extended or adjusted under 35 U.S.C. 154(b) by 354 days.

(21) Appl. No.: 11/045,969

(22) Filed: Jan. 28, 2005

(65) Prior Publication Data

US 2005/0230158 A1    Oct. 20, 2005

(30) Foreign Application Priority Data

Feb. 4, 2004    (JP)    ............... 2004-028539

(51) Int. Cl.
  B62D 51/04    (2006.01)
  B62D 11/02    (2006.01)
  H01H 9/04     (2006.01)
  H06H 9/06     (2006.01)
  B66F 9/20     (2006.01)

(52) U.S. Cl. ............ 180/19.3; 180/6.5; 200/293.1; 200/332.2; 187/224

(58) Field of Classification Search ............ 180/19.3, 180/6.5, 332, 333; 200/4, 6 A, 6 BA, 18, 200/293.1, 332.2; 187/224; 318/66
See application file for complete search history.

(56) References Cited

U.S. PATENT DOCUMENTS

| | | | | |
|---|---|---|---|---|
| 2,399,605 A * | 4/1946 | Schroeder | ............... | 180/65.1 |
| 2,992,565 A * | 7/1961 | Hansen et al. | ............... | 74/346 |
| 3,134,063 A * | 5/1964 | Hastings, Jr. | ............... | 318/139 |
| 3,293,381 A * | 12/1966 | Eitel | ............... | 200/6 A |
| 3,814,199 A * | 6/1974 | Jones | ............... | 180/6.5 |
| 3,970,160 A * | 7/1976 | Nowick | ............... | 180/6.5 |
| 4,204,099 A * | 5/1980 | Cryer | ............... | 200/4 |
| 4,281,526 A * | 8/1981 | Lipschutz | ............... | 70/202 |
| 5,736,700 A * | 4/1998 | Takahashi et al. | ............... | 200/61.54 |
| 6,550,161 B2 * | 4/2003 | Hanafusa et al. | ............... | 37/246 |
| 6,756,750 B2 * | 6/2004 | Wakitani et al. | ............... | 318/54 |
| 6,798,160 B2 * | 9/2004 | Wakitani et al. | ............... | 318/432 |
| 2005/0087373 A1 * | 4/2005 | Wakitani et al. | ............... | 180/6.5 |

FOREIGN PATENT DOCUMENTS

JP    02137755    5/2002

* cited by examiner

*Primary Examiner*—Lesley D. Morris
*Assistant Examiner*—Daniel Yeagley
(74) *Attorney, Agent, or Firm*—Adams & Wilks

(57) ABSTRACT

An electric vehicle has traveling units, first and second electric motors for driving the respective traveling units, a speed adjusting lever for adjusting a speed of the traveling units, a speed adjustment mechanism for generating a speed adjusting signal in response to operation of the speed adjusting lever, and a control unit for controlling rotation of the first and second electric motors in accordance with the speed adjusting signal generated by the speed adjustment mechanism. The speed adjusting lever has spot-turn switches operable to cause the respective electric motors to rotate in a reverse direction and simultaneously cause the electric motors to rotate in a forward direction, a rotational-angle restriction mechanism that restricts a rotational angle of a rotational operating member, and an automatic return mechanism that automatically returns the rotational operating member to a neutral position upon removal of an operating force having turned the rotational operating member in a first direction or in a second direction from the neutral position.

9 Claims, 14 Drawing Sheets

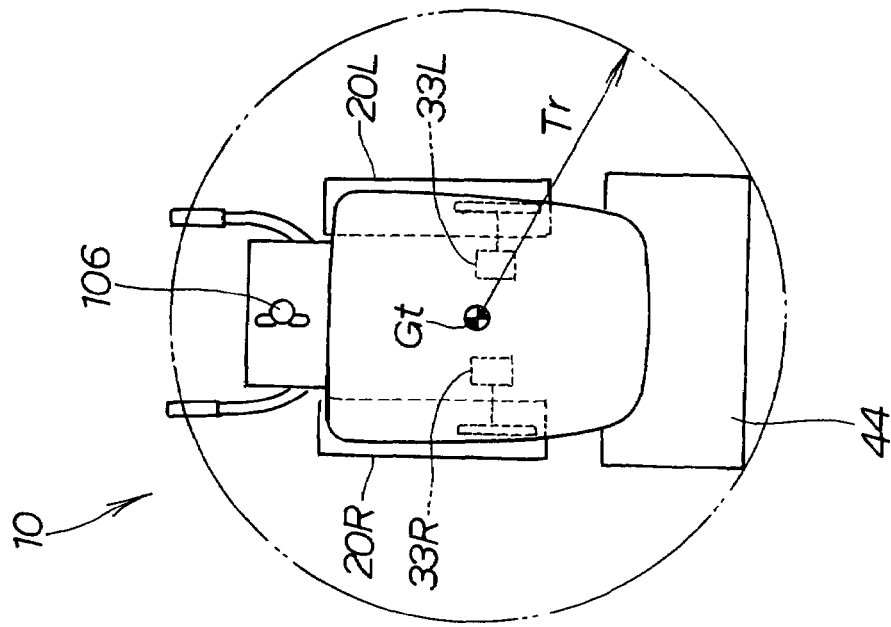
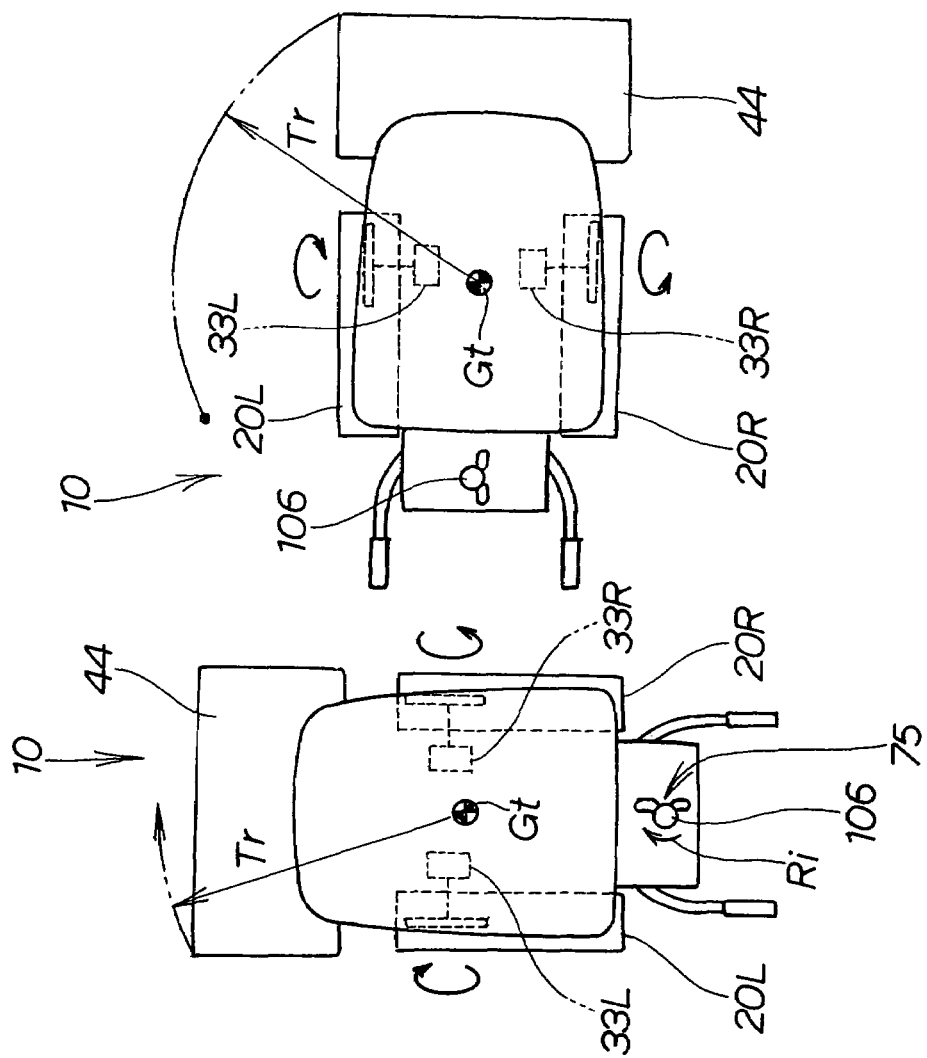

ELECTRIC VEHICLE

FIELD OF THE INVENTION

The present invention relates to electric vehicles having left and right traveling units driven via left and right motors, respectively.

BACKGROUND OF THE INVENTION

Examples of electric vehicles, where left and right traveling units are driven via left and right motors, respectively, include electric truck vehicles and various working machines, such as snow removing machines and cultivators. Particularly, the working machines tend to prove more useful if they are capable of turning left and right with smaller turning radii depending on the working states.

To achieve a reduced turning radius of an electric vehicle, there are generally employed two approaches: (1) a "pivot turn" approach that causes the electric vehicle to make a U-turn by forward-rotating the outer traveling unit (i.e., one of the two traveling units which is located inward of the other as viewed in the turning direction) with the inner traveling unit placed in a stopped (deactivated) state; (2) a "spot turn" approach that causes the electric vehicle to make a U-turn by reverse-rotating the inner traveling unit while forward-rotating the outer traveling unit.

The "spot turn" is more preferable to enhance the turning capability of electric vehicles, and one example of such electric vehicles is proposed in Japanese Patent Application Laid-open Publication No. 2002-137755 and will be discussed below with reference to FIGS. 13A and 13B.

The electric vehicle 200 shown in FIG. 13A includes left and right electric motors 203L and 203R that are powered by a battery 202, accommodated in a space defined by a vehicle body frame 201, to rotate left and right driving wheels 205L and 205R via driven shafts 204L and 204R. Left and right crawlers 206L and 206R are driven via the left and right driving wheels 205L and 205R. Truck box 210 is placed on the vehicle body frame 201, and a control or operation panel 211 and control unit 212 are provided behind the truck box 210. On the operation panel 211, there are provided a single accelerator lever (speed adjusting lever) 213, left and right brake levers 214L and 214R, and left and right turning switches 215L and 215R.

The control unit 212 collectively controls the left and right motors 203L and 203R and left and right brakes 207L and 207R on the basis of respective detected operating positions of the accelerator lever 213 and brake levers 214L and 214R.

The accelerator lever 213 is an operation lever operable by the human operator to instruct forward movement, stoppage or rearward movement of the left and right crawlers 206L and 206R and to continuously switch from low-speed forward/rearward travel to high-speed forward/rearward travel of the vehicle via the left and right crawlers 206L and 206R. Operating position of the accelerator lever 213 can be monitored via a not-shown accelerator potentiometer (that functions as a speed adjustment means).

While walking behind the electric vehicle with both hands holding left and right operating handles 221L and 221R extending rearward from rear portions of the vehicle body frame 201, the human operator can not only cause the electric vehicle to travel forward/rearward, turn or stop by operating any of the accelerator lever 213, brake levers 214L, 214R, etc. on the operation panel 211, but also cause the electric vehicle to make a spot turn by operating the left or right turning switch 215L or 215R,.

By the human operator depressing the right turning switch 215R as depicted by arrow Pu in FIG. 13B, the left motor 203R is rotated in the forward direction to drive the left crawler 206L in the forward direction, and simultaneously the right motor 203R is rotated in the reverse direction to drive the right crawler 206R in the rearward direction. Consequently, the electric vehicle 200 can make a right spot turn about a turning center G (i.e., a center point, in front-and-rear and left-and-right directions, between the left and right crawlers 206L and 206R) with a turning radius R corresponding to a distance to a left corner of the truck box 210.

To cause the electric vehicle 200 to travel forward or rearward, the human operator manipulates the operating handles 221L, 221R etc. with one hand while adjusting the vehicle speed by holding and manipulating the accelerator lever 213 with the other hand.

Also, to cause the electric vehicle 200 to make a spot turn under such operating conditions, the human operator temporarily lets go of (i.e., takes the hand off) the accelerator lever 213 and operates the left or right turning switch 215L or 215R. However, each time a spot turn is to be made, it requires certain skill for the human operator to temporarily let go of the accelerator lever 213 and operate the left or right turning switch 215L, 215R located at a considerable distance from the various levers. Therefore, further improvements have to be made in order to enhance the operability or usability of the conventional electric vehicle 200, especially, for an enhanced spot-turning capability of the vehicle.

SUMMARY OF THE INVENTION

The present invention provides an improved electric vehicle, which comprises: an operation panel provided on a machine body; left and right traveling units provided on opposite sides of the machine body; left and right electric motors for driving the left and right traveling units, respectively; a speed adjusting lever provided on the operation panel for adjusting a speed of the left and right traveling units; a speed adjustment section for generating a speed adjusting signal in response to operation of the speed adjusting lever; and a control unit for controlling rotation of the left and right electric motors on the basis of the speed adjusting signal output by the speed adjustment section. In the present invention, the speed adjusting lever includes: a left spot-turn switch operable to cause the left electric motor to rotate in a reverse direction and simultaneously cause the right electric motor to rotate in a forward direction; and a right spot-turn switch operable to cause the right electric motor to rotate in the reverse direction and simultaneously cause the left electric motor to rotate in the forward direction.

With the speed adjusting lever including the left and right spot-turn switches, the human operator of the electric vehicle can readily operate either one of the left and right spot-turn switches with the same hand holding the speed adjusting lever, through effective manipulation of the speed adjusting lever that is normally used most frequently during travel of the electric vehicle.

In this way, the human operator can adjust the travel speed of the electric vehicle by holding the speed adjusting lever with one hand, and, even when a left or right spot turn is to be made, the operator can readily operate a desired one of the left and right spot-turn switches without having to take the one hand off the speed adjusting lever. In other words, the human operator can use the one hand to perform both the speed adjusting operation and the spot-turning operation; especially, the human operator can readily perform the spot-turning operation with no particular skill required. Thus, the present invention can significantly enhance the usability and turning operability of the electric vehicle, especially, for an enhanced spot-turning capability of the vehicle. In addition, the human operator can cause the electric vehicle to make a desired spot turn in accordance with his or her sense of turning operation. Furthermore, because the left and right spot-turn switches are provided on the speed adjusting lever, the present invention can achieve significant aggregation of the component parts.

In an embodiment of the present invention, the speed adjusting lever further includes: a grip provided on a distal end portion of a lever body; a rotational operating member rotatably mounted on the lever body and located closer to a proximal end of the speed adjusting lever than the grip; a rotational-angle restriction mechanism for restricting a rotational angle of the rotational operating member; an automatic return mechanism for auto-matically returning the rotational operating member to a neutral position upon removal of an operating force having turned the rotational operating member leftward or rightward from the neutral position; a slide contact provided on a surface of the rotational operating member opposite from the grip; and a fixed base plate provided on the lever body and having three fixed contacts on a surface thereof opposed to the slide contact. The rotational-angle restriction mechanism includes: a groove portion formed in an end surface of the rotational operating member and having a predetermined groove length along a rotational direction of the rotational operating member; and a projection formed on the lever body or the grip and fitting in the groove portion in such a manner that the groove portion can be displaced through a predetermined rotational angle along the rotational direction. Further, the automatic return mechanism includes a cam groove portion and an abutting member resiliently urged in abutting contact with the cam groove portion, and the cam groove portion or the abutting member is provided on an end surface of the rotational operating member while the abutting member or the cam groove portion is provided on the lever body or the grip that is a fixed member of the speed adjusting lever. Furthermore, the three fixed contacts are a middle, neutral contact, a left contact located to the immediate left of the neutral contact and a right contact located to the immediate right of the neutral contact, and the neutral contact, the left contact and the slide contact together constitute the above-mentioned left spot-turn switch while the neutral contact, the right contact and the slide contact together constitute the above-mentioned right spot-turn switch.

In the present invention, the human operator can adjust the travel speed of the electric vehicle by holding the grip provided on the distal end portion of the lever body of the speed adjusting lever. The electric vehicle can make a left spot turn in response to the human operator extending his or her hand, holding the grip, to the rotational operating member located immediately below the grip and turning the operating member leftward to operate the left spot-turn switch. Similarly, the electric vehicle can make a right spot turn in response to the human operator extending the hand, holding the grip, to the rotational operating member and turning the operating member rightward to operate the right spot-turn switch. Then, as the human operator lets go of (i.e., takes the hand off the rotational operating member and holds the grip alone, the rotational operating member is automatically returned to its original neutral position via the automatic return mechanisms, so that the left and right spot-turn switches are both placed in the OFF state and thus the spot turn is terminated.

Because the human operator can adjust the travel speed of the electric vehicle by holding the grip of the speed adjusting lever as noted above, the present invention can secure sufficient operability for the travel speed adjustment operation. Also, because the present invention allows the human operator to readily perform spot-turning operation by just extending his or her hand, holding the grip, to the rotational operating member located immediately below the grip and then turning the operating member leftward or rightward, it can even further enhance the usability and turning operability of the electric vehicle, especially, for an enhanced spot-turning capability of the vehicle. Furthermore, since the spot-turning operation can be performed by only turning the rotational operating member in the direction where the electric vehicle should turn, the desired spot turn can be made in accordance with human operator's sense of turning operation. In addition, because the left and right spot-turn switches and related components are provided in the vicinity of the grip of the speed adjusting lever, the present invention can achieve significant aggregation of the component parts.

BRIEF DESCRIPTION OF THE DRAWINGS

Certain preferred embodiments of the present invention will hereinafter be described in detail, by way of example only, with reference to the accompanying drawings, in which:

FIGS. 11A-11C are views explanatory of behavior of the snow removing machine of the present invention when the machine is caused to make a spot turn;

DETAILED DESCRIPTION OF THE PREFERRED EMBODIMENTS

The following paragraphs describe an electric vehicle of the present invention in relation to a case where the electric vehicle is embodied as a snow removing machine.

Figure 1:
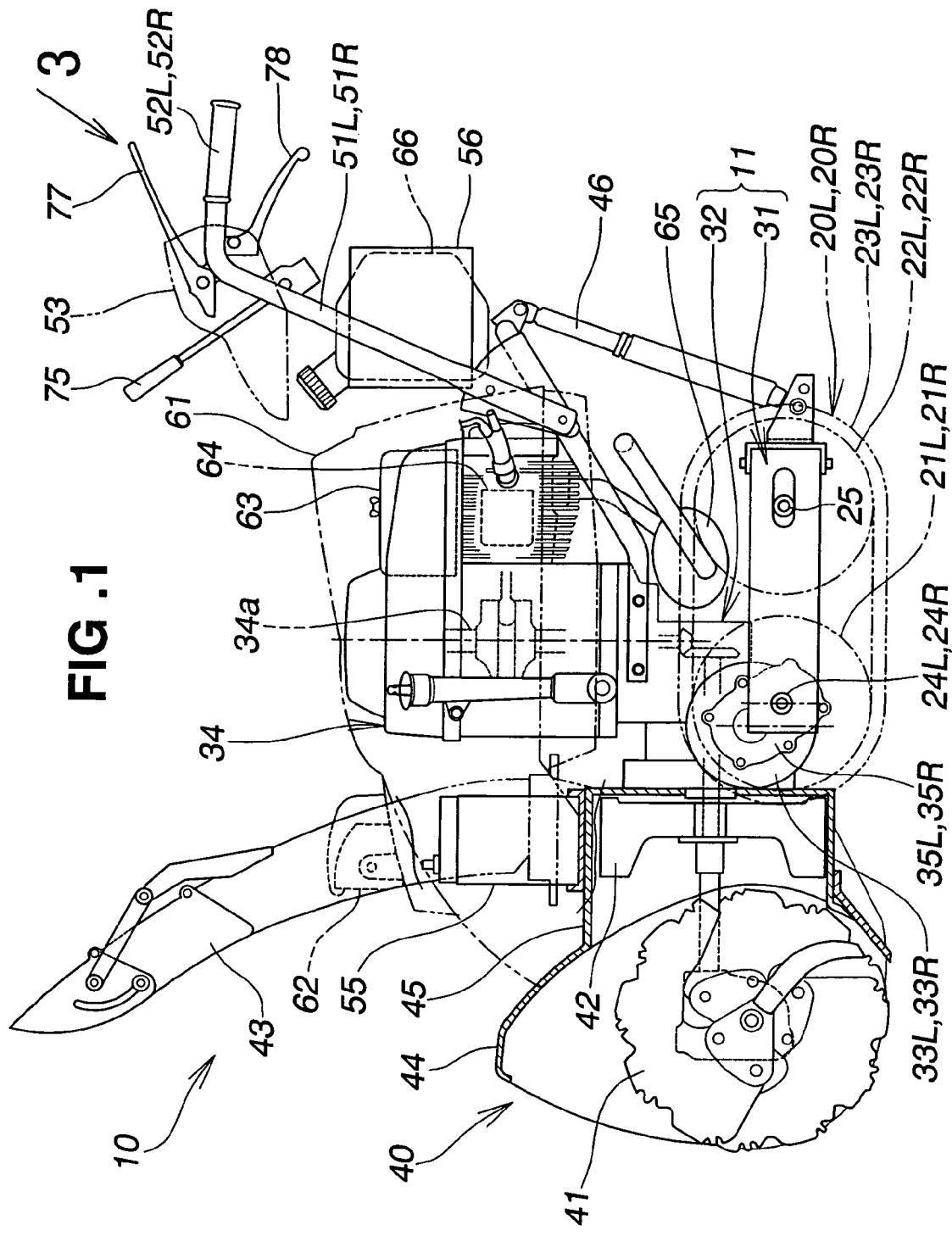
FIG. 1 is a left side view of a snow removing machine in accordance with a preferred embodiment of the present invention.
Figure 2:
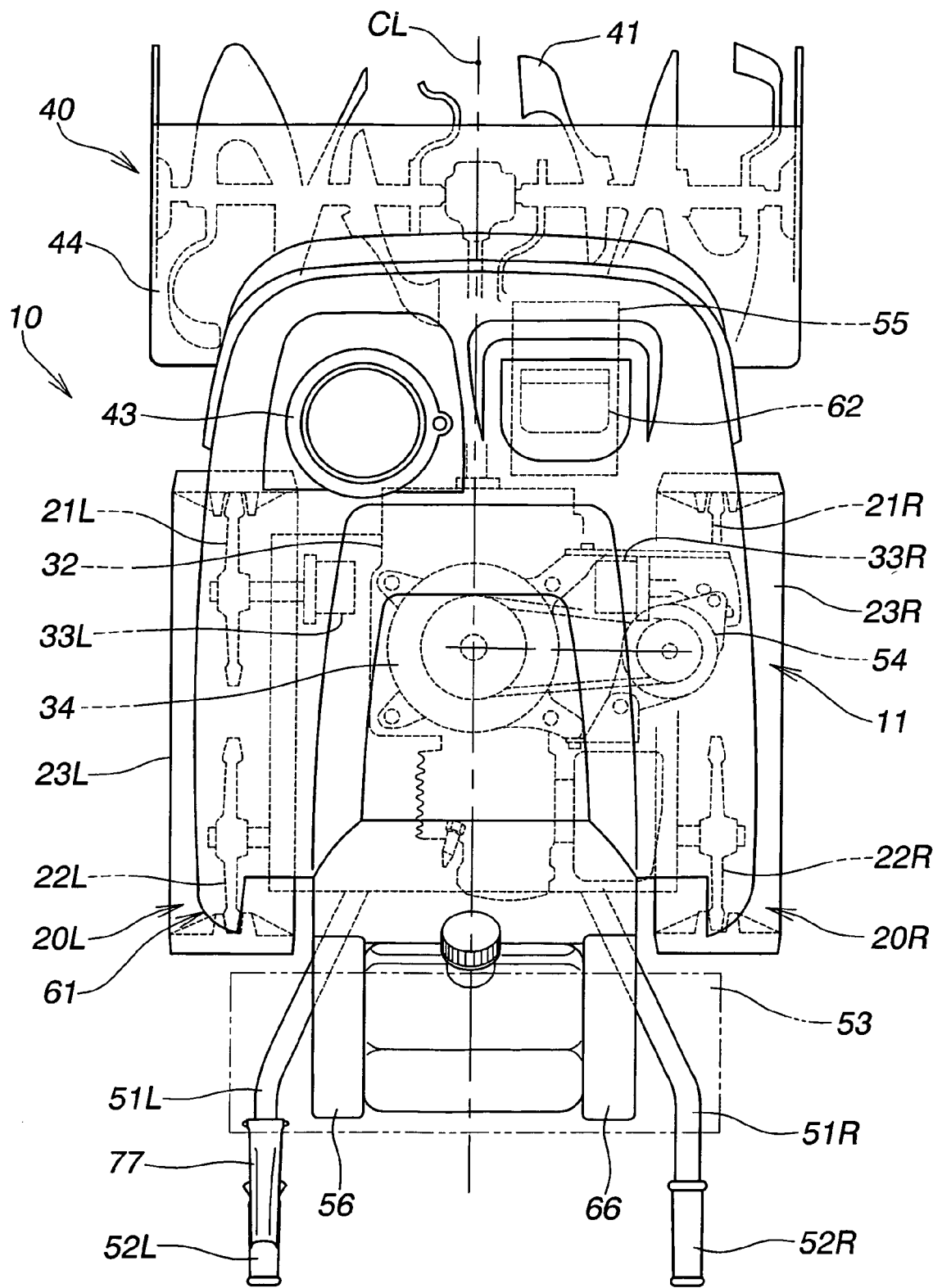
FIG. 2 is a top plan view of the snow removing machine of FIG. 1.

As illustrated in FIGS. 1 and 2, the snow removing machine 10, constructed as an embodiment of the present invention, includes a machine body 11 composed of a traveling unit frame 31 and transmission case 32.

The traveling unit frame 31 has left and right traveling units 20L and 20R mounted thereon. The transmission case 32 is connected to the traveling unit frame 31 for vertical pivotal movement. Left and right motors 33L and 33R are secured to left and right sides of the transmission case 32, and an engine (internal combustion engine) 34 is mounted on an upper portion of the transmission case 32. Snow removing working unit 40 is attached to a front portion of the transmission case 32. Left and right operating handles 51L and 51R extend rearwardly and upwardly from an upper portion of the transmission case 32, and a control or operation panel 53 is disposed between the left and right operating handles 51L and 51R.

The snow removing machine 10 is a self-propelled, walk-behind type working machine where a human operator walks behind the operation panel 53 while holding grips 52L and 52R provided at the respective distal ends of the left and right operating handles 51L and 51R.

In the snow removing machine 10 of the present invention, the engine 34 drives the snow removing working unit 40, and the left and right motors 33L and 33R only drive the left and right traveling units 20L and 20R. The snow removing machine 10 is so arranged on the basis of the underlying idea that the electric motor is suited for traveling speed control, turning movement control and forward/rearward travel switching control while the more powerful internal combustion engine is suited for driving of a working section that is subject to rapid load variation.

The left and right motors 33L and 33R are traveling drive sources for driving the left and right traveling units 20L and 20R via left and right transmission mechanisms 35L and 35R.

The left traveling unit 20L is in the form of a crawler including a crawler belt 23L wound on a front driving wheel 21L and rear idling wheel 22L, where the driving wheel 21L is rotated via the left motor 33L in forward and reverse directions. The right traveling unit 20R is also in the form of a crawler including a crawler belt 23R wound on a front driving wheel 21R and rear idling wheel 22R, where the driving wheel 21R is rotated via the right motor 33R in forward and reverse directions.

The traveling unit frame 31 rotatably supports left and right driving wheel axles 24L and 24R on its front portion and an idling wheel axle 25 on its rear portion. The left and right driving wheel axles 24L and 24R are rotational shafts on which are fixedly mounted the left and right driving shafts 21L and 21R, respectively. The left and right idling wheels 22L and 22R are rotatably mounted on the idling wheel axle 25.

The engine 34, which is in the form of a vertical engine having a crankshaft 34a extending downward, is a working drive source for supplying power to the snow removing working unit 40 via a working power transmission mechanism accommodated in the transmission case 32.

The snow removing working unit 40 includes a front auger 41, a rear blower 42, an upper shooter 43, an auger housing 144 covering the auger 41, and a blower housing 45 covering the blower 42. The auger 41 gathers snow, piled up on the ground, toward the center of the machine 10, and the blower 42 receives and throws the gathered snow to desired positions around the machine 10 through the shooter 43.

Pivot drive mechanism 46 causes the transmission case 32 and snow removing working unit 40 to pivot vertically so as to adjust an orientation or posture of the auger housing 44.

As seen in FIG. 2, the machine body 11 has a power generator 54 and battery 55 mounted on its front portion.

Namely, on the machine body 11 of the snow removing machine 10, there are provided: the working unit 40, such as the snow removing unit; internal combustion engine 34 for driving the working unit 40; traveling units 20L and 20R including the crawlers and wheels; electric motors 33L and 33R for driving the traveling units 20L and 20R; power generator 54 driven by the engine 34 for supplying electric power to the battery 55 and motors 33L and 33R; and a control unit 56 for controlling the motors 33L and 33R. The control unit 56 is disposed, for example, under or within the operation panel 53.

In the figure, reference numeral 61 represents a cover covering the engine 34 and other components around the engine 34, 62 a lamp, 63 an air cleaner, 64 a carburetor, 65 an engine exhaust muffler, and 66 a fuel tank.

Figure 3:
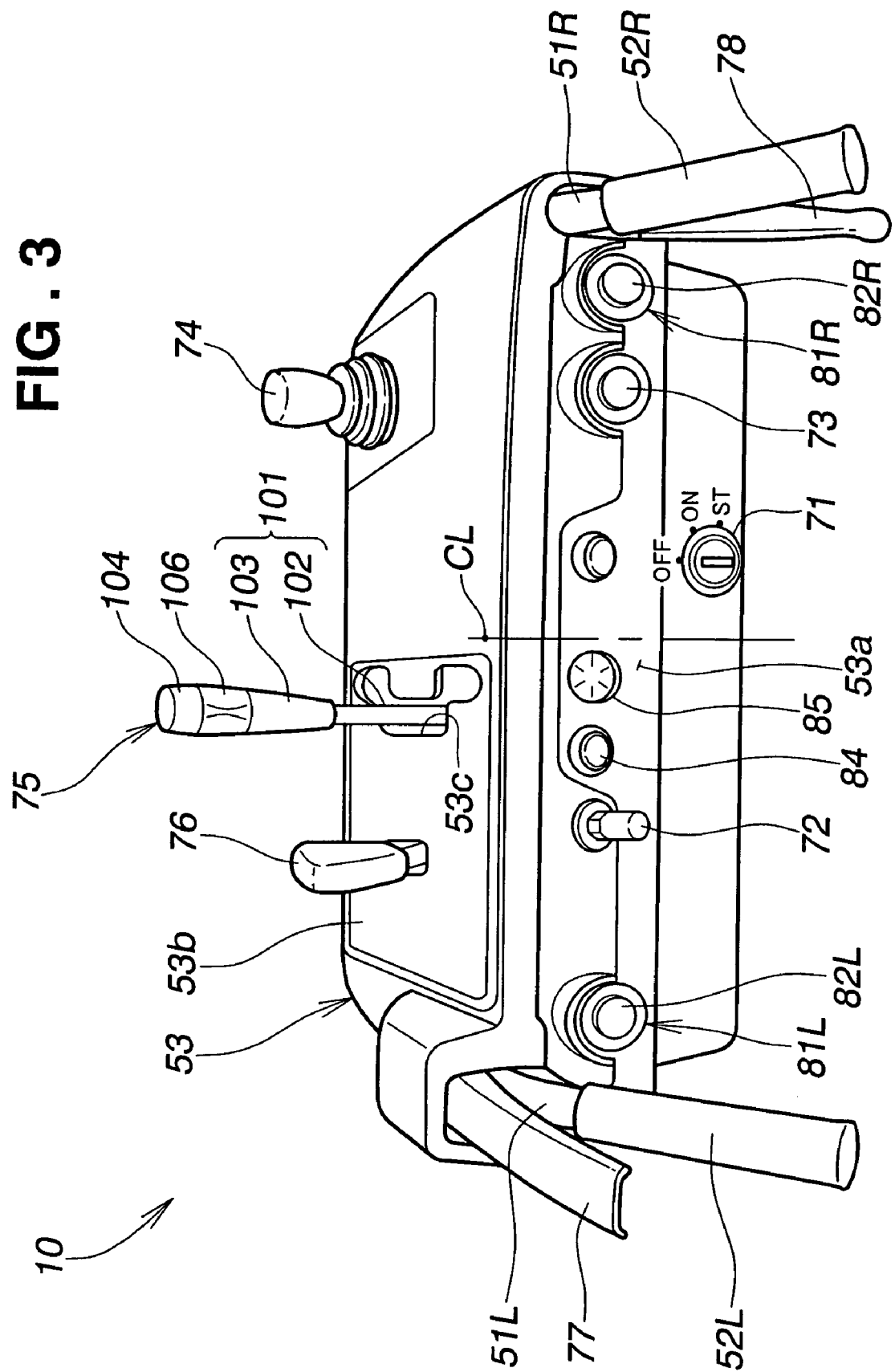
FIG. 3 is a view of the snow removing machine taken in a direction of arrow "3" of FIG. 1.

As illustrated in FIG. 3, the operation panel 53 includes, on its rear or operator-side surface 53a (i.e., surface facing the human operator), a main switch 71; an engine choke 72, a clutch operating switch 73, etc. On an upper surface 53b of the operation panel 53, there are provided, from right to left, a snow-throwing-direction adjusting lever 74, a direction/speed control lever 75 for the traveling units, and an engine throttle lever 76. Further, the left grip 52L and right grip 52R are located to the left and right of the operation panel 53.

The left operating handle 51L also includes a travel preparation lever 77 near the grip 52L, while the right operating handle 51R also includes an auger-housing-posture adjusting lever 78 near the grip 52R.

In FIGS. 1 and 3, the main switch 71 is a conventionally-known ignition switch, and the human operator can activate the engine 34 by inserting a main key (not shown) in a key hole of the switch 71 and turning the inserted main key. For example, an "OFF" position, "ON" position and "ST" (start) position are set sequentially in a clockwise direction around the key hole in the order mentioned.

Setting the main key to the "OFF" position can not only deactivate the engine 34 but also turn off all electric systems in the snow removing machine 10. Shifting the main key from the "OFF" position to the "ON" position can deactivate or stop operation of the engine 34. Setting the main key to the "ST" (start) position can activate or start operation of the engine 34. Further, shifting the main key from the "ST" (start) position to the "ON" position can cause the activated engine 34 to change over directly to its full-scale operation.

The engine choke 72 is an operating member that can be pulled by the human operator to increase the concentration of an air-fuel mixture. The clutch operating switch 73 is a push button switch for turning on/off the working unit 40.

The snow-throwing-direction adjusting lever 74 is a lever operable to change the operating direction of the shooter 43. The direction/speed control lever 75 is a forward/rearward travel speed adjusting lever operable to not only adjust the rotating speed of the motors 33L and 33R but also switch between forward and reverse rotating directions of the motors 33L and 33R to thereby switch between forward and rearward traveling directions of the snow removing machine 10.

Figure 4:
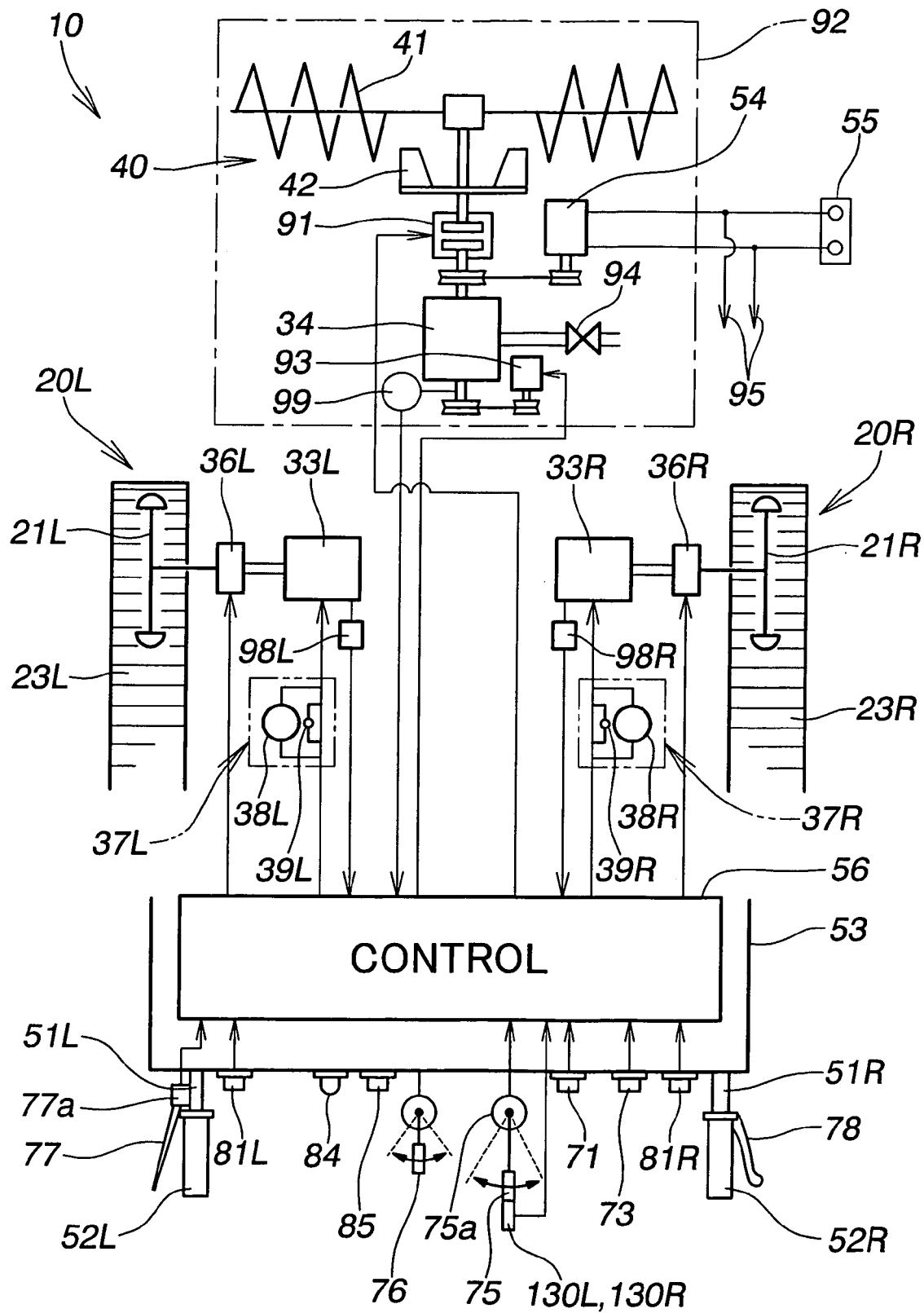
FIG. 4 is a control block diagram of the snow removing machine of the present invention.

The engine throttle lever 76 is a lever for controlling the number of rotations of the engine 34 by adjusting the opening of a throttle valve (94 in FIG. 4).

The travel preparation lever 77 is an operating member acting on a switch 77a (FIG. 4); the switch 77a is turned off when the lever 77 is brought to a free position by pulling operation of a return spring. When the human operator uses his or her left hand to hold and depress the travel preparation lever 77 toward the grip 52L, the switch 77a is turned on. Whether or not the travel preparation lever 77 is being held by the human operator is detectable on the basis of the ON/OFF state of the switch 77a.

The auger-housing-posture adjusting lever 78 is a lever operable by the human operator when the posture of the auger housing 44 is to be changed through operation of the pivot drive mechanism 46.

The operation panel 53 also includes left and right turning operation switches 81L and 81R between the left and right operating handles 51L and 51R and within a range where the human operator can manipulate the turning operation switches 81L and 81R with the same hands holding the operating handles 51L and 51R.

Specifically, the left turning operation switch 81L and its push button 82L are provided on the operator-side surface 53a of the operation panel 53 inwardly of the left grip 52L (namely, located closer than the grip 52L to an imaginary longitudinal centerline CL extending lengthwise of the machine 10, i.e., centrally of the width of the vehicle). Similarly, the right turning operation switch 81R and its push button 82R are provided on the operator-side surface 53a of the operation panel 53 inwardly of the right grip 52R (namely, located closer than the grip 52R to the imaginary longitudinal centerline CL extending lengthwise of the machine 10.

In FIG. 3, reference numeral 84 represents an alarm display, 85 an alarm sound device.

FIG. 4 is a control block diagram of the snow removing machine 10. The engine 34, electromagnetic clutch 91, auger 41 and blower 42 together constitute a working system 92, and the remaining components constitute a traveling system First, behavior of the snow removing working unit 40 will be described.

Starter 93 and engine 34 are activated by the human operator inserting the key in the main switch 71 and turning the inserted key to the "ST" (start) position ST of FIG. 3. The engine throttle lever 76 controls the number of rotations of the engine 34 by adjusting the opening of the throttle valve 94 via a not-shown throttle wire.

The power generator 54 is driven by a portion of the output of the engine 34, and electric power thus produced by the generator 54 is supplied to the battery 55 and left and right motors 33L and 33R. The remaining portion of the output of the engine 34 is supplied via the electromagnetic clutch 91 to the auger 41 and blower 42 for rotation thereof. The power generator 54 and battery 55 supply, via a wiring harness 95, electric power to the left and right motors 33L and 33R and other electric equipment of the machine 10.

Reference numerals 98L and 98R represent rotation sensors for detecting the numbers of rotations (rotating speeds) of the left and right electric motors 33L and 33R.

Once the human operator activates the clutch operating switch 73 while griping the travel preparation lever 77, the electromagnetic clutch 91 is brought to a connecting state so that the auger 41 and blower 42 are driven to rotate by the output power of the engine 34. The electromagnetic clutch 91 is brought back to a disconnecting state as the human operator shifts the travel preparation lever 77 to the free position or again depresses the clutch operating switch 73.

Next, behavior of the traveling units 20L and 20R will be described.

The instant embodiment of the snow removing machine 10 includes left and right electromagnetic brakes 36L, and 36R that function like parking brakes of vehicles. Specifically, the respective rotation shafts of the left and right motors 33L and 33R are braked by the electromagnetic brakes 36L and 36R. During parking of the machine 10, the electromagnetic brakes 36L and 36R are in a braking state under control of the control unit 56; the electromagnetic brakes 36L and 36R can be shifted to a non-braking state in the following manner.

Namely, the electromagnetic brakes 36L and 36R are shifted to the non-braking (or open) state once the direction/speed control lever 75 is shifted to a forward or rearward travel position while 1) the main switch 71 is in the "ON" position and 2) the travel preparation lever 77 is being gripped by the human operator.

Figure 5:
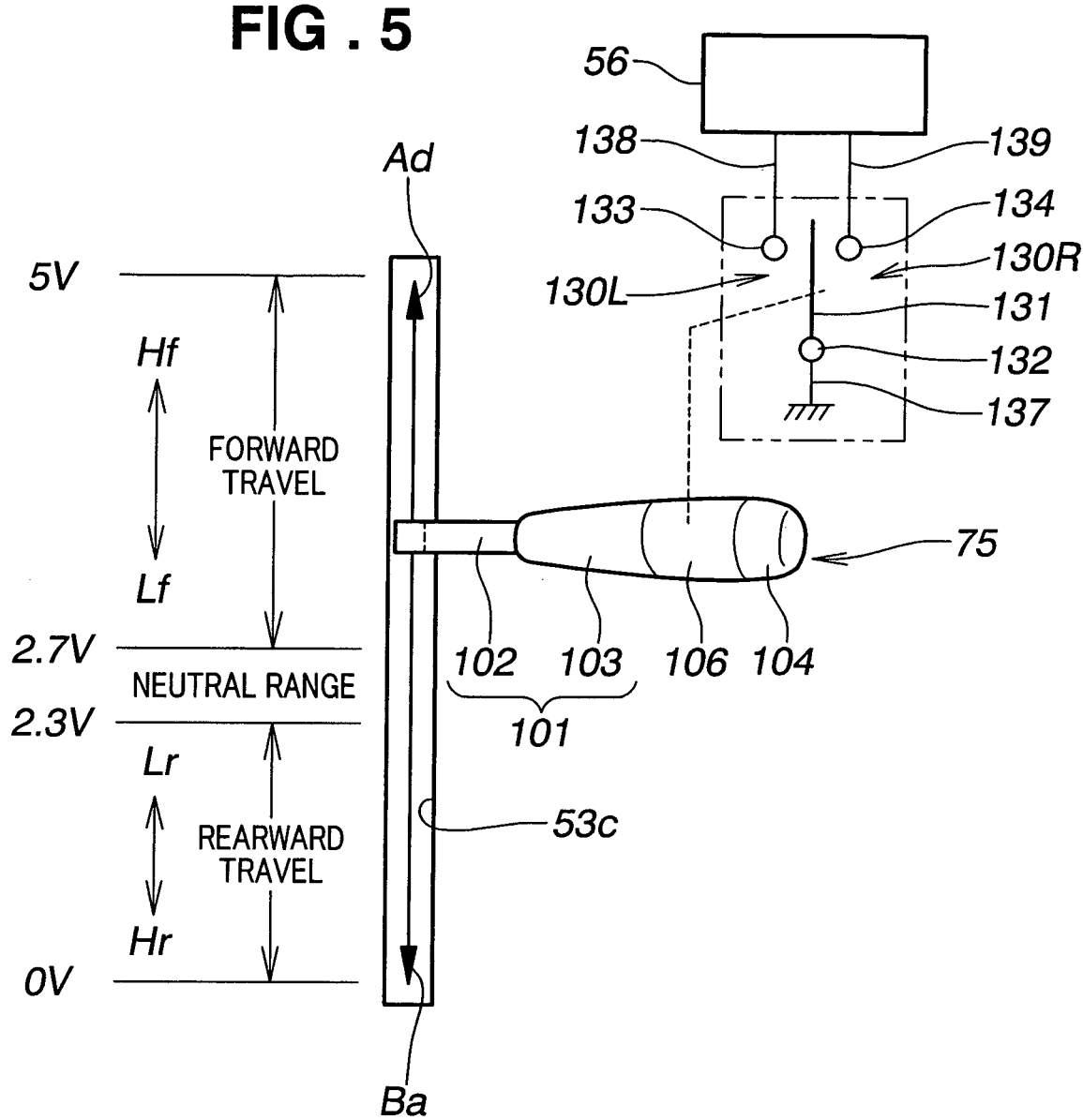
FIG. 5 is a schematic view showing details of a direction/speed control lever employed in the snow removing machine of the present invention.

FIG. 5 shows how the direction/speed control lever 75 employed in the instant embodiment operates. As seen in FIG. 5, the direction/speed control lever 75 is reciprocatively movable by operation of the human operator in opposite directions, along an elongated guide hole 53c in the operation panel 53 (see FIG. 3), as indicated by arrows Ad and Ba. If the direction/speed control lever 75 is shifted from a "neutral" range Ne to a "forward travel" range, the vehicle moves forward. In the "forward travel" range, the machine is variable between a low forward traveling speed Lf and a high forward traveling speed Hf. Similarly, if the direction/speed control lever 75 is shifted from the "neutral" range Ne to a "rearward travel" range, the vehicle moves rearward. In the "rearward travel" range, the machine is variable between a low rearward traveling speed Lr and a high rearward traveling speed Hr.

In the illustrated example of FIG. 5, voltages corresponding to the various positions of the direction/speed control lever 75 are generated via a potentiometer 75a (see FIG. 4) in such a manner that 0 V corresponds to the maximum rearward traveling speed, 5 V corresponds to the maximum forward traveling speed and 2.3 V-2.7 V corresponds to the neutral range. Namely, the potentiometer 75a also functions as a travel speed adjustment section or means for generating an adjusting signal in response to operation, by the human operator, of the direction/speed control lever 75. In this way, the single direction/speed control lever 75 can set both a desired one of the forward and rearward traveling directions and a desired traveling speed between the high and low traveling speeds.

Hereinafter, the direction/speed control lever 75 and potentiometer 75a will be referred to as "travel speed adjusting lever" and "travel speed adjustment device", respectively, as appropriate.

Referring back to FIG. 4, the control unit 56, on the basis of position information of the direction/speed control lever 75 received via the potentiometer 75a, controls the rotation of the left and right motors 33L and 33R via left and right motor drivers 37L and 37R. Rotating speeds of the motors 33L and 33R are detected via the rotation sensors 98L and 98R. On the basis of the detection signals output from the rotation sensors 98L and 98R, the control unit 56 performs feedback control such that the rotating speeds of the motors 33L and 33R assume predetermined values. As a consequence, the left and right driving wheels 21L and 21R can each rotate in a desired direction and at a desired speed.

Braking of the snow removing machine 10 takes place in the following manner. In the instant embodiment of the invention, the motor drivers 37L and 37R include regenerative brake circuits 38L and 38R and short-circuit brakes 39L and 39R.

As generally known, the electric motor is rotated by electric energy supplied from a battery to the motor, and the power generator converts rotational force into electric energy. Thus, the instant embodiment of the invention converts the motors 33L and 33R into power generators, by appropriate electrical switching, so as to generate electric power. If the voltage of the generated electric power is greater than the battery voltage, then the electric energy can be stored in the battery 55. This is the basic operating principle of the regenerative brakes 38L and 38R.

During depression, by the human operator, of the left turning operation switch 81L, the control unit 56 keeps the left regenerative brake 38L in the activated or ON state, on the basis of a switch-ON signal of the switch 81L, to lower the speed of the left motor 33L. Thus, the snow removing machine 10 can make a left pivot turn only while the left turning operation switch 81L is being depressed.

Similarly, during depression, by the human operator, of the right turning operation switch 81R, the control unit 56 keeps the right regenerative brake 38R in the ON state, on the basis of a switch-ON signal of the switch 81R, to lower the speed of the right motor 33R. Thus, the snow removing machine 10 can make a right pivot turn only while the right turning operation switch 81R is being depressed.

Then, the snow removing machine 10 can be caused to stop traveling by
(1) shifting the main switch 71 back to the OFF position,
(2) shifting the direction/speed control lever 75 back to the neutral position;, or
(3) letting go of the travel preparation lever 77.

The travel of the machine 10 can be stopped using short-circuit brake circuits 39L and 39R after the following electrical deceleration control is performed.

The left short-circuit brake circuit 39L literally short-circuits two poles of the left motor 33L and thereby rapidly brakes the left motor 33L, and similarly the right short-circuit brake circuit 39R literally short-circuits two poles of the right motor 33R to thereby rapidly brake the right motor 33R.

As the main switch 71 is shifted back to the "OFF" position after termination of the machine travel, the electromagnetic brakes 36L and 36R are brought to the braking state, which achieves generally the same effect as when a parking brake is activated.

The direction/speed control lever (travel speed adjusting lever) 75 has left and right spot-turn switches 130L and 130R provided thereon. The left spot-turn switch 130L is an operation switch for causing the left motor 33L to rotate in the reverse direction and simultaneously causing the right motor 33R to rotate in the forward direction, while the right spot-turn switch 130R is an operation switch for causing the right motor 33R to rotate in the reverse direction and simultaneously causing the left motor 33L to rotate in the forward direction.

The control unit 56 controls the left and right motors 33L and 33R in accordance with output switch signals from the left and right spot-turn switches 130L and 130R.

As apparent from the foregoing, the snow removing machine 10 of the present invention includes the operation panel 53 on its machine body 11, left and right traveling units 20L and 20R, left and right motors 33L and 33R for driving the left and right traveling units 20L and 20R, travel speed adjusting lever 75 provided on the operation panel 53 for adjusting the speed of the left and right traveling units 20L and 20R, travel speed adjustment section 75a for generating a speed adjusting signal in response to operation of the travel speed adjusting lever 75, and control unit 56 for controlling the left and right motors 33L and 33R on the basis of the speed adjusting signal output from the travel speed adjustment section 75a.

Figure 6:
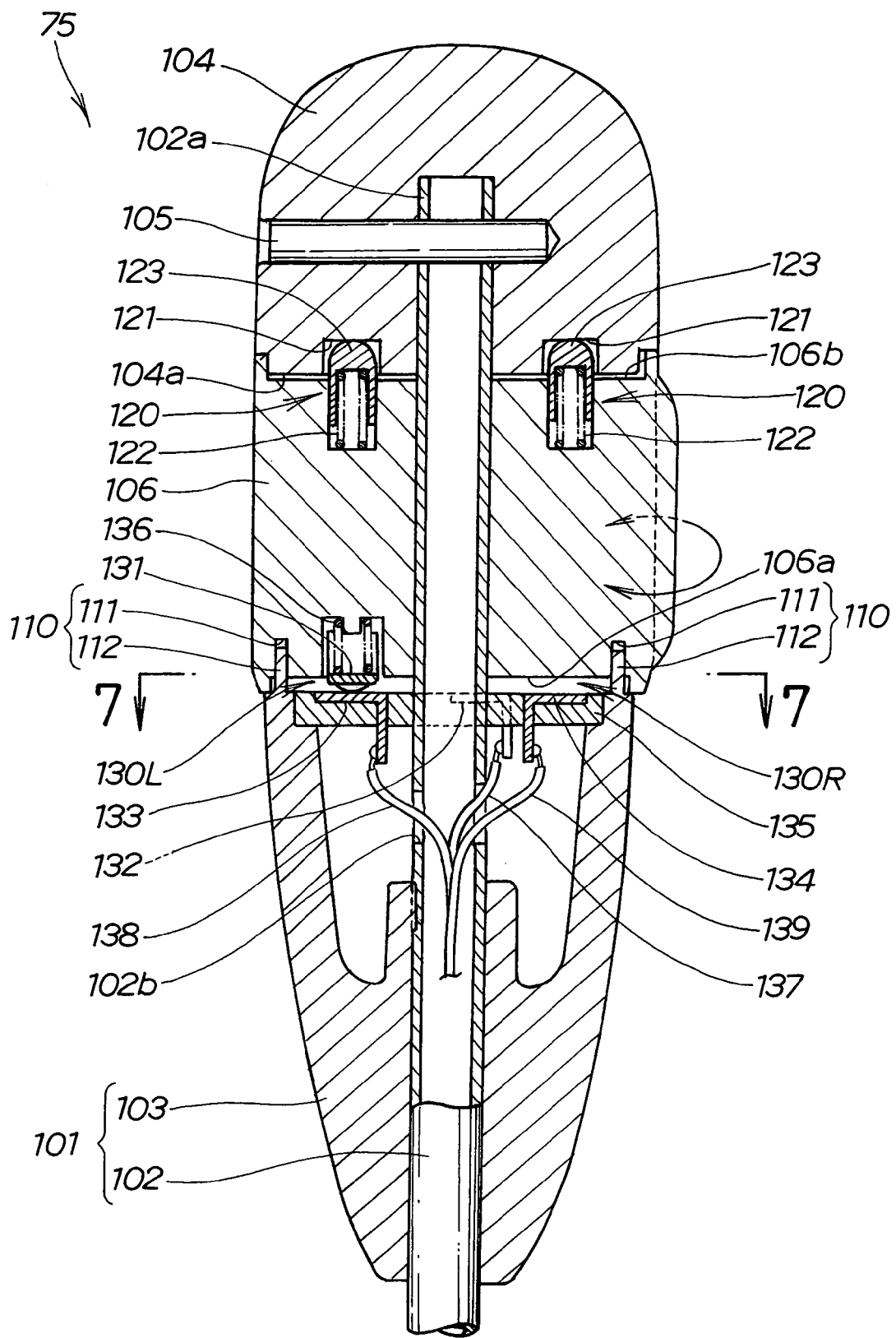
FIG. 6 is a sectional view of the direction/speed control lever shown in FIG. 5.
Figure 8A:
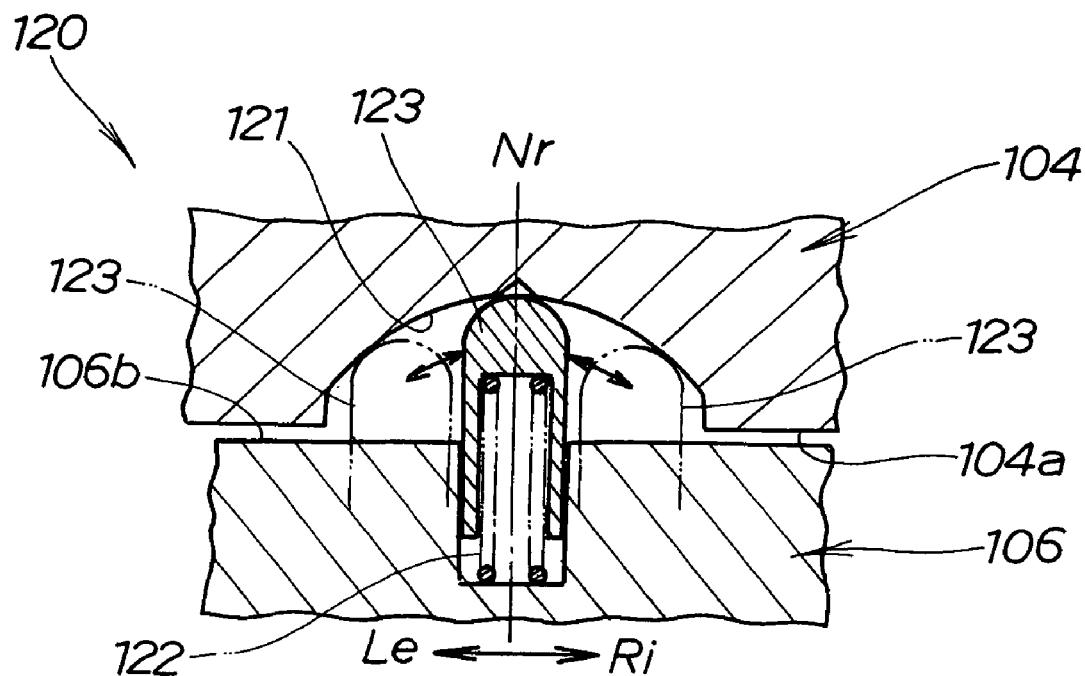
FIGS. 8A and 8B are an enlarged sectional view of an automatic return mechanism shown in FIG. 6,. and a sectional view of a modified automatic return mechanism.
Figure 8B:
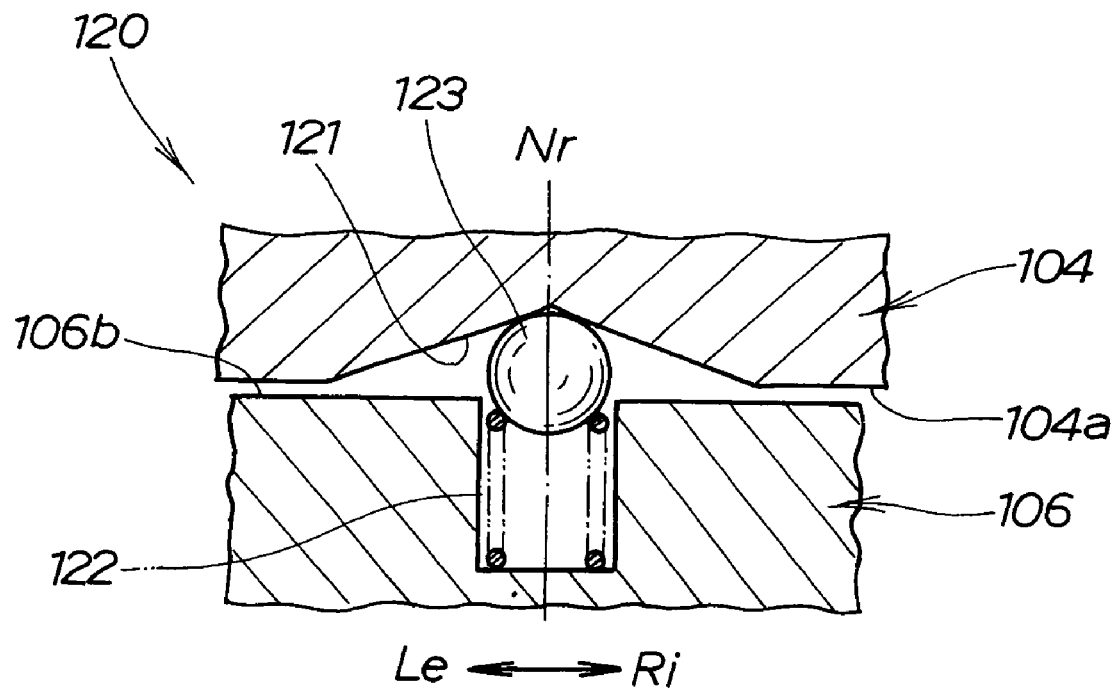
Figure 9A:
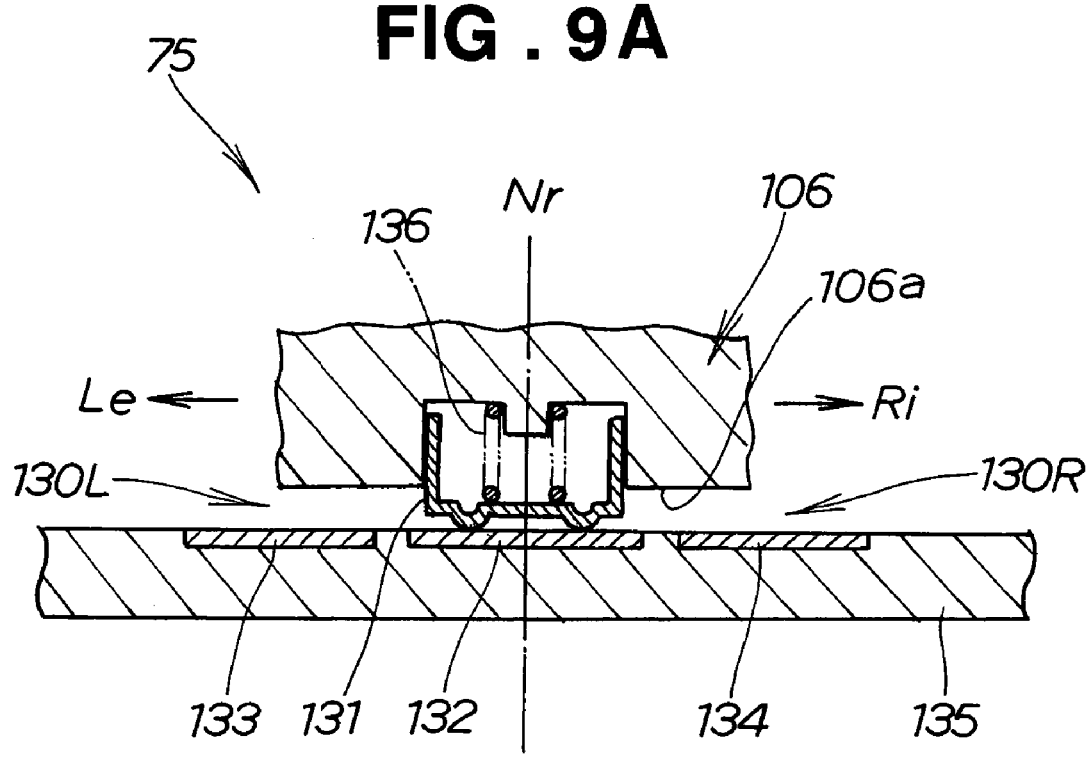
FIGS. 9A and 9B are sectional views showing left and right spot-turn switches as developed in a circumferential direction of a travel speed adjusting lever.
Figure 9B:
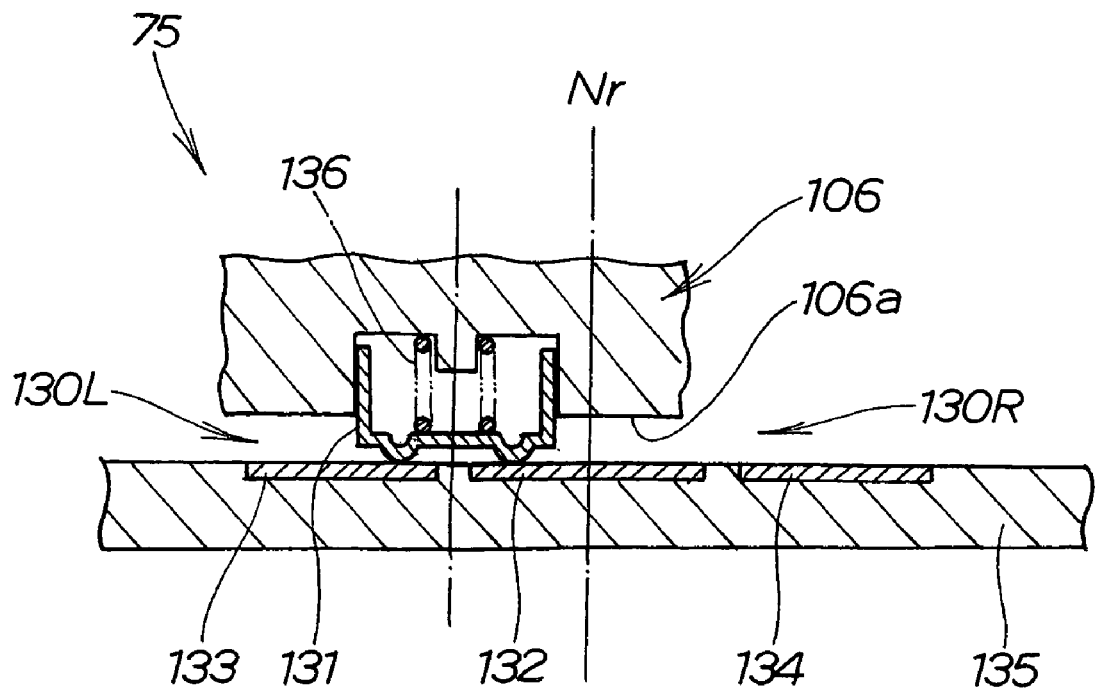

Next, details of the direction/speed control lever (travel speed adjusting lever) 75 and left and right spot-turn switches 130L and 130R will be described with reference to FIGS. 6, 7, 8A, 8B, 9A and 9B. FIG. 6 shows a distal end portion of the travel speed adjusting lever 75, and FIGS. 8A and 8B show an automatic return mechanism 120 as developed in a circumferential direction of the lever 75. FIGS. 9A and 9B show the left and right spot-turn switches 130L and 130R as developed in the circumferential direction of the travel speed adjusting lever 75.

The travel speed adjusting lever 75 shown in FIG. 6 includes a grip 104 provided on a distal end portion of a lever body 101, and a rotational operating member 106 rotatably mounted on the lever body 101 and located closer to a proximal end of the lever 75 (i.e., closer to the potentiometer 75a of FIG. 4) than the grip 104. The travel speed adjusting lever 75 also includes left and right rotational-angle restriction mechanisms 110 for restricting a rotational angle of the rotational operating member 106, and left and right automatic return mechanisms 120 for automatically returning the rotational operating member 106 to a neutral position.

The left and right automatic return mechanisms 120 allow the rotational operating member 106 to rotate leftward or rightward from the neutral position in response to rotational operating force applied by the human operator, and then automatically return the rotational operating member 106 to the neutral position upon removal of the rotational operating force.

Single slide contact 131 is provided on a surface 106a of the rotational operating member 106 opposite from the grip 104. Fixed base plate 135 is secured to the lever body 101 and has three fixed contacts 132, 133 and 134 on its surface opposed to the slide contact 131.

The lever body 101 has a lever section 102 of, for example, a pipe shape, and a cover section 103 generally in the shape of a bottomed cylinder non-rotatably mounted on the lever section 102. The lever section 102 has a portion 102a projecting above the cover section 103. The grip 104 is non-rotatably mounted on the projecting portion 102a by means of a fastener member 105, such as a pin. The cover section 103 has an opening portion that opens toward the grip 104. The fixed base plate 135, which has a disk shape, is secured to the opening portion of the cover section 103 by means of a screw or otherwise.

The rotational operating member 106 is interposed between the cover section 103 and the grip 104, and it is in the form of a disk-shaped knob rotatably fitted over the lever 102. Movement of the rotational operating member 106 relative to the longitudinal axis of the lever section 102 is restricted by the cover section 103 and the grip 104.

Figure 7:
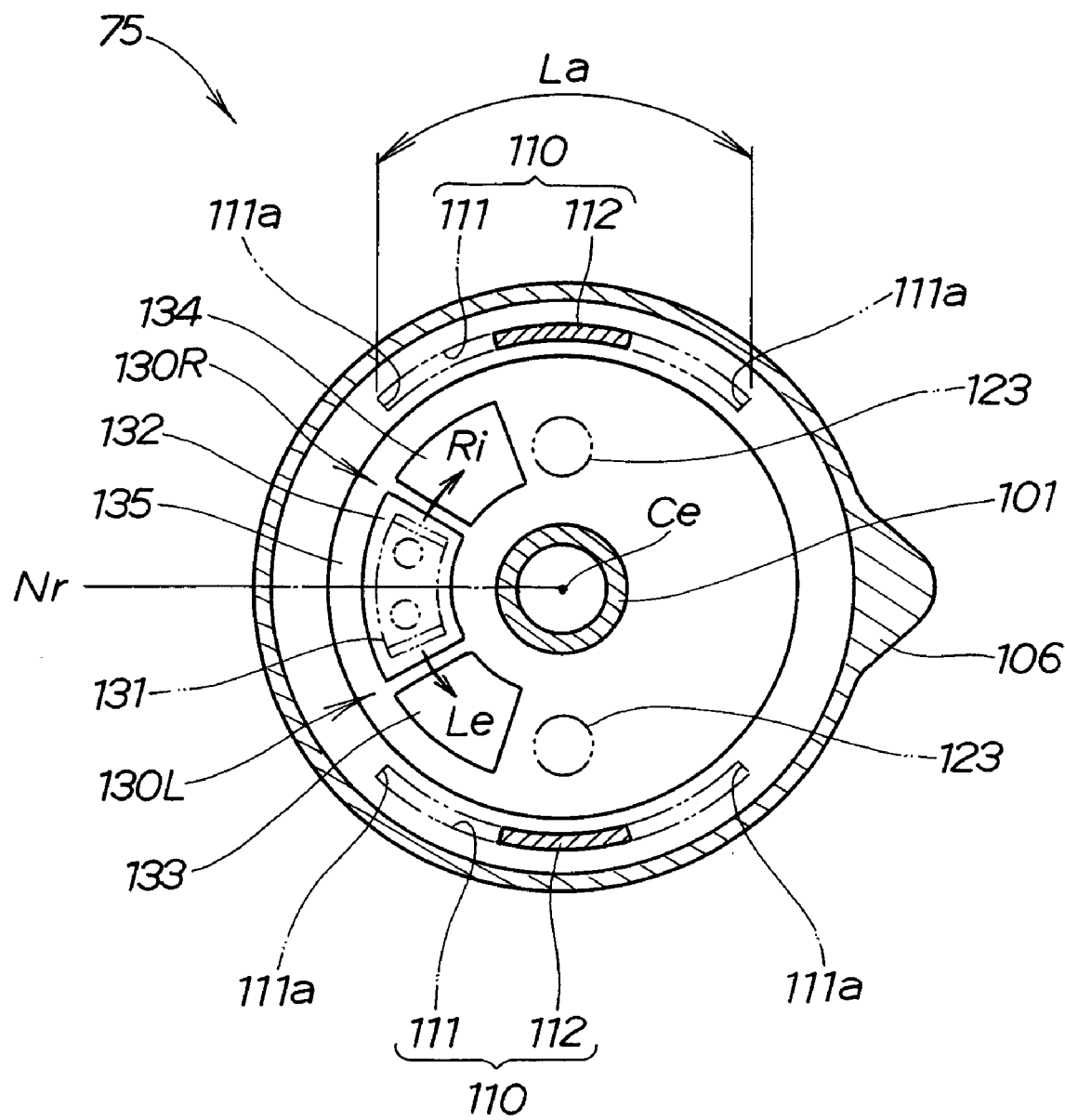
FIG. 7 is a sectional view taken along line 7-7 of FIG. 6.

As illustrated in FIGS. 6 and 7, the left and right rotational-angle restriction mechanisms 110 comprise a pair of groove portions 111, and a pair of projections 112 fitting in the respective groove portions 111.

The groove portions 111 are formed in the surface 106a of the rotational operating member 106 opposed to the cover section 103 of the lever body 101. As viewed in plan, the fitting groove portions 111 each have an arcuate shape and a groove length La in a rotational direction of the rotational operating member 106, and are located in symmetry about an axial center Ce of the lever section 102 (see FIG. 7).

The fitting projections 112 are formed on the cover section 103 of the lever body 101 and each have an arcuate shape as viewed in plan. The projections 112 fit in the respective fitting groove portions 111 in such a manner that the groove portions 111 can be angularly displaced through a predetermined angle along the rotational direction.

As seen in FIG. 7, the groove portions 111 in a neutral position abut at their respective one ends 111a against the corresponding fixed projections 112 as the rotational operating member 106 is rotated, and the rotational angle of the member 106 is restricted accordingly. In an alternative, the fitting projections 112 may be formed on the grip 104.

As seen in FIGS. 6 and 8A, the automatic return mechanisms 120 are so-called "click mechanisms" which comprise a pair of cam groove portions 121, and a pair of abutting members 123 normally urged by resilient members 122 into abutting contact with the cam groove portions 121. In the illustrated example, each of the abutting members 123 is in the form of a projecting member. Each of the cam groove portions 121 is formed in an end surface 104a of the grip 104 opposed to the rotational operating member 106 and has a substantially elliptical sectional shape. Further, in the illustrated example, each of the abutting members 123 is a pin provided on an end surface 106b of the rotational operating member 106 opposed to the grip 104.

In FIG. 8A, the automatic return mechanism 120 is shown as being in its neutral position Nr, where the abutting member 123 is also in a neutral position Nr to abut against a deepest area of the cam groove portion 121 as indicated by solid lines. As the rotational operating member 106 is rotated or turned in a leftward or rightward direction Le or Ri against the bias of the resilient member 122, the abutting member 123 is displaced to one of positions indicated by imaginary lines. As the rotational operating force is removed from the rotational operating member 106, the abutting member 123 projects upward, by the urging force of the resilient member 122, back to the original neutral position Nr along a sloped surface of the cam groove portion 121. As a consequence, the rotational operating member 106 automatically returns to the neutral position Nr, FIG. 8B shows a modification of the automatic return mechanism 120, which is characterized in that the cam groove portion 121 has a "V" sectional shape having a gentle sloped surface and in that the abutting member 123 is a ball.

The automatic return mechanisms 120 only have to be constructed by providing the cam groove portions 121 or abutting members 123 on the end surface of the rotational operating member 106 and providing the abutting members 123 or cam groove portions 121 on the fixed lever body 101 or grip 104.

As shown in FIGS. 6, 7 and 9A, the three fixed contacts 132-134 provided on the fixed base plate 135 are a neutral contact 132 located in the neutral position Nr, left contact 133 located to the immediate left of the neutral contact 132, and right contact 134 located to the immediate right of the neutral contact 132. Thus, the slide contact 131, neutral contact 132 and left contact 133 together constitute the left spot-turn switch 130L, and the slide contact 131, neutral contact 132 and right contact 134 together constitute the right spot-turn switch 130R. Reference numeral 136 represents a resilient member for normally urging the slide contact 131 toward the fixed base plate 135.

FIG. 9A shows the slide contact 131 in the neutral position Nr, when the left and right spot-turn switches 130L and 130R are kept in an OFF state. As the rotational operating member 106 is turned in the leftward direction Le under the conditions of FIG. 9A, the slide contact 131 is displaced to a position as illustrated in FIG. 9B to electrically connect between the neutral contact 132 and the left contact 133, so that the left spot-turn switch 130L is turned on. Similarly, as the rotational operating member 106 is turned in the rightward direction Ri under the conditions of FIG. 9A, the slide contact 131 is displaced to electrically connect between the neutral contact 132 and the right contact 134, so that the right spot-turn switch 130R is turned on. Namely, as also apparent from FIG. 9B, the left and right spot-turn switches 130L and 130R will never be turned on concurrently.

As illustrated in FIG. 6, three harnesses 137, 138 and 139 connected respectively to the fixed contacts 132, 133 and 134 are coupled to the outside through an insertion hole 102b and the interior of the pipe-shaped lever section 102. Namely, as seen in FIG. 5, the neutral contact 132 is grounded via the harness 137, the left contact 133 is connected to the control unit 56 -via the harness 138, and the right contact 134 is connected to the control unit 56 via the harness 139. The left and right spot-turn switches 130L and 130R supply ON/OFF switch signals to the control unit 56.

Now, an example flow of control performed by the control unit 56 of FIG. 4 will be described with reference to flow charts of FIGS. 10A and 10B and FIGS. 4 and 5. The control flow is started up, for example, in response to turning-on of the main switch 71.

Figure 10A:
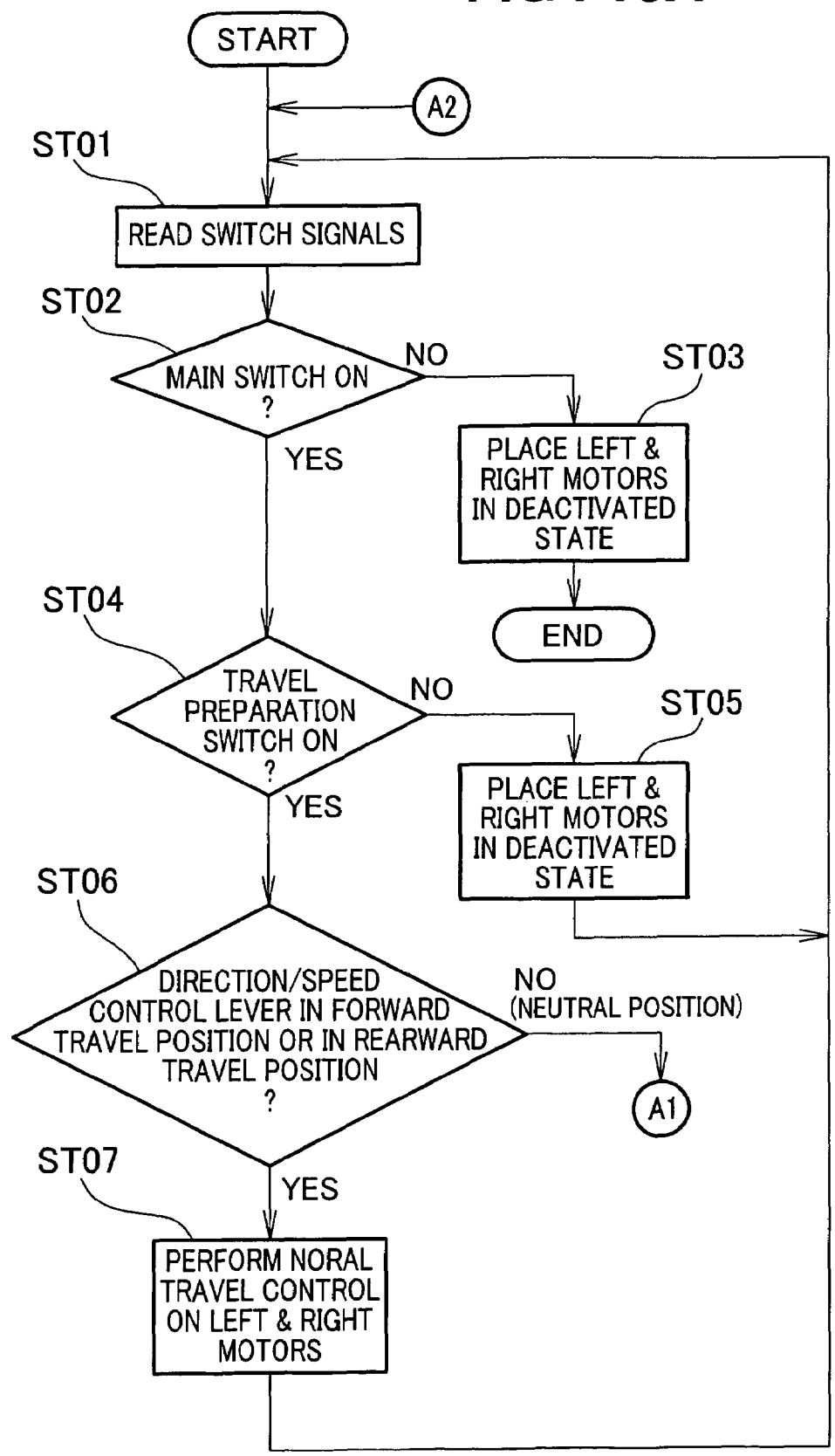
FIGS. 10A and 10B are a flow chart showing an example flow of control performed by a control unit shown in FIG. 4.

Step ST01 of FIG. 10A: Switch signals (including a lever position signal) from the main switch 71, direction/speed control lever (travel speed adjusting lever) 75, switch 77a of the travel preparation lever 77, left and right turning operation switches 81L and 81R, left and right spot-turn switches 130L and 130R, etc. are read by the control unit 56.

Step ST02: A determination is made as to whether the main switch 71 is currently in the "ON" position. If answered in the negative (i.e., with a NO determination), the control goes to step ST03, but if answered in the affirmative (i.e., with a YES determination), the control proceeds to step ST04.

Step ST03: The left and right motors 33L and 33R are placed in the OFF (deactivated or stopped) state, and then the control is brought to an end.

Step ST04: It is determined whether the switch 77a of the travel preparation lever 77 (i.e., travel preparation switch 77a) is currently ON. With a NO answer, the control goes to step ST05, but, with a YES answer, the control proceeds to step ST06.

Step ST05: The left and right motors 33L and 33R are placed in the OFF state, and then the control reverts to step 01.

Step ST06: A determination is made as to whether the direction/speed control lever 75 is currently in the forward travel position or in the rearward travel position. If answered in the negative, the control goes to step ST08 of FIG. 10B, judging that the direction/speed control lever 75 is in the neutral position. If answered in the affirmative, the control proceeds to step ST07.

Step ST07: Normal travel control is performed, on the basis of the operating direction and amount of the direction/speed control lever 75, other switch signals, sensor signals, etc., to control the rotation of the left and right motors 33L and 33R, and then the control reverts to step ST01.

Figure 10B:
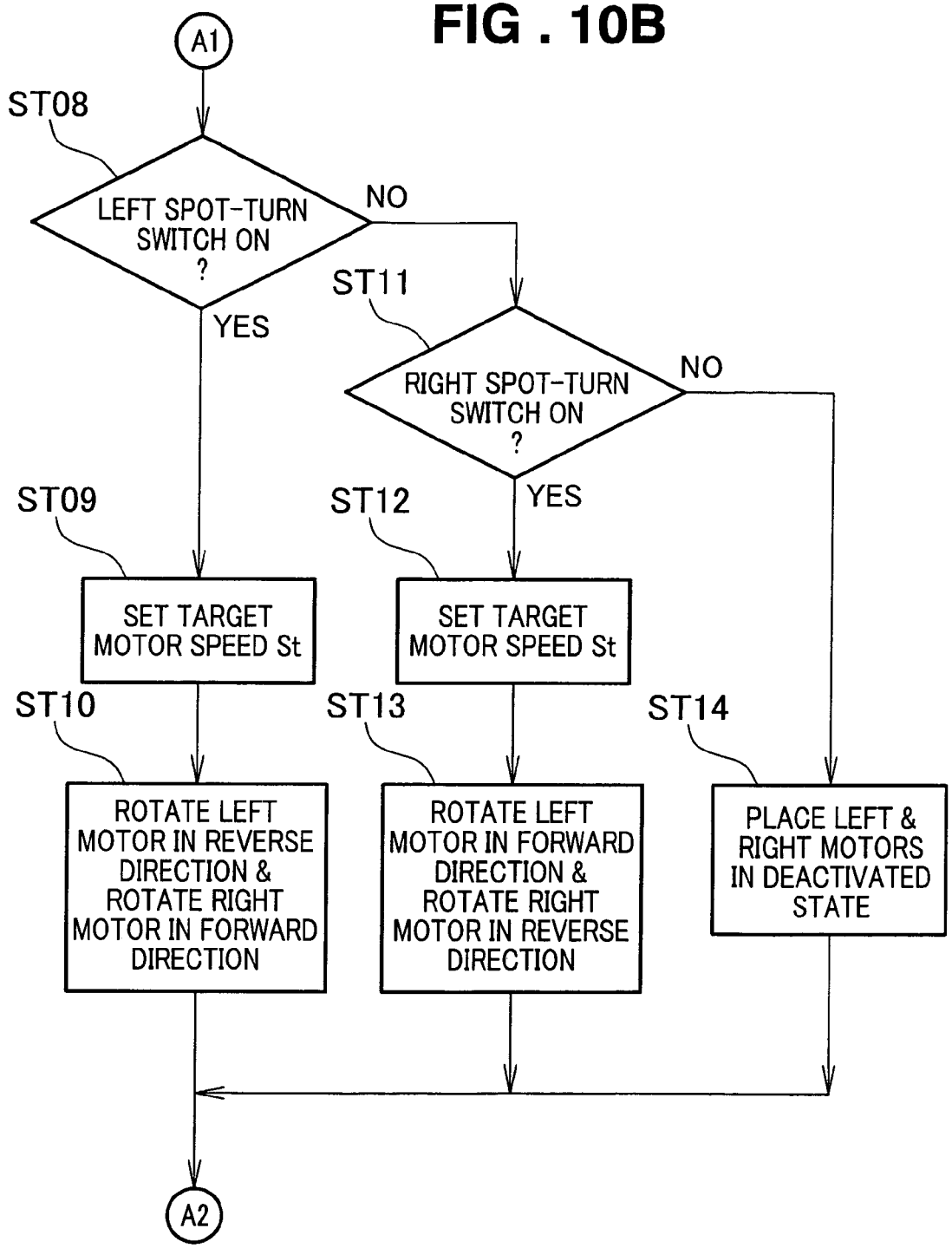

Step ST08 of FIG. 10B: A determination is made as to whether the left spot-turn switch 130L is currently ON. With a YES determination, the control proceeds to step ST09, while, with a NO determination, the control branches to step ST11.

Step ST09: Target speed St of the left and right motors 33L and 33R is set for making a left spot turn. The target speed St is of a relatively small value, e.g. 300 rpm, and a speed of the left spot turn (e.g., 0.1-0.5 km/hr) is determined in accordance with the thus-set target speed St.

Step ST10: The left motor 33L is rotated in the reverse direction while the right motor 33R is rotated in the forward direction, and then the control reverts to step ST01 of FIG. 10A.

Step ST11: A determination is made as to whether the right spot-turn switch 130R is currently ON. With a YES determination, the control proceeds to step ST12, while, with a NO determination, the control branches to step ST14.

Step ST12: Target speed St of the left and right motors 33L and 33R is set for making a right spot turn. The target speed St is of a relatively small value, e.g. 300 rpm, and a speed of the left spot turn (e.g., 0.1-0.5 km/hr) is determined by the thus-set target speed St.

Step ST13: The left motor 33R is rotated in the reverse direction while the left motor 33L is rotated in the forward direction, and then the control reverts to step ST01 of FIG. 10A.

Step ST14: The left and right motors 33L and 33R are both placed in the OFF (deactivated) state, after which the control reverts to step ST01 of FIG. 10A.

The above-described control flow is organized in Table 1 below and will be explained further on the basis of Table 1.

left and right motors 33L and 33R are placed in the stopped (deactivated) state, so that the snow removing machine 10 is maintained in its stopped state.

(3) In Mode No. 6, where the travel preparation switch 77a is ON, the direction/speed control lever 75 is in the neutral position and the left spot-turn switch 130L is ON with the spot-turn switch 130R OFF, the left motor 33L rotates in the reverse direction while the right motor 33R rotates in the forward direction. Consequently, the snow removing machine 10 makes a left spot turn.

(1) In each of Mode No. 7 and Mode No. 8, where the travel preparation switch 77a is ON and the direction/speed control lever 75 is in the forward or rearward travel position, the left and right motors 33L and 33R rotate in the normal manner on the basis of the operating direction of the direction/speed control lever 75, irrespective of the operating states of the left and right spot-turn switches 130L and 130R, so that the snow removing machine 10 travels forward or rearward in accordance with the operating direction of the direction/speed control lever 75.

Namely, only when the direction/speed control lever (speed adjusting lever) 75 is in the neutral position, i.e. only when the snow removing machine 10 is in the stopped state or low-speed traveling state close to the stopped state, the snow removing machine 10 is allowed to make a left or right spot turn by the human operator operating the left or right spot-turn switches 130L or 130R. Therefore, the snow removing machine 10 will never suddenly make a spot turn during its straight-ahead travel or the like. Further, by setting the left and right motors 33L and 33R to a relatively low

TABLE 1

| Mode No. | Travel Preparation Lever | Position of Direction/Speed Control Lever | Left Spot-Turn Switch | Right Spot-Turn Switch | Left Motor | Right Motor | Result |
|---|---|---|---|---|---|---|---|
| 1 | OFF | Neutral | OFF | OFF | Stop | Stop | Stop |
| 2 | OFF | Neutral | ON | OFF | Stop | Stop | Stop |
| 3 | OFF | Forward or Rearward | OFF | OFF | Stop | Stop | Stop |
| 4 | OFF | Forward or Rearward | ON | OFF | Stop | Stop | Stop |
| 5 | ON | Neutral | OFF | OFF | Stop | Stop | Stop |
| 6 | ON | Neutral | ON | OFF | Reverse Rotation | Forward Rotation | Left Spot Turn |
| 7 | ON | Forward or Rearward | OFF | OFF | Normal | Normal | Forward or Rearward Travel |
| 8 | ON | Forward or Rearward | ON | OFF | Normal | Normal | Forward or Rearward Travel |

The following paragraphs describe the control operations for each one of mode 1-mode 8 in Table 1 above. Whereas the table illustrates example control operations to be performed for a left spot turn, similar control operations take place for a right spot turn.

(1) In each of Mode No. 1-Mode No. 4, where the travel preparation switch 77a is OFF, the left and right motors 33L and 33R are kept in the stopped (deactivated) state, irrespective of the operating direction of the direction/speed control lever 75 and operating states of the left and right spot-turn switches 130L and 130R, so that the snow removing machine 10 is maintained in its stopped state.

(2) In Mode No. 5, where the left and right spot-turn switches 130L and 130R are both in the OFF state with the travel preparation switch 77a in the ON state and the direction/speed control lever 75 in the neutral position, the speed for a desired spot turn, the snow removing machine 10 is allowed to make the desired spot turn at low speed. Thus, the snow removing machine 10 is allowed to make any desired spot turn in accordance with human operator's sense of turning operation, which thereby achieves enhanced operability of the machine 10.

FIGS. 11A-11C show behavior of the snow removing machine 10 when making a spot turn, e.g. right spot turn.

As illustrated in FIG. 11A, as the human operator turns the rotational operating member 106 of the direction/speed control lever (speed adjusting lever) 75 in the rightward (clockwise) direction Ri, the right motor 33R rotates in the reverse direction so that the right crawler 20R is driven in the rearward traveling direction, and simultaneously the left motor 33L rotates in the forward direction so that the left crawler 20L is driven in the forward traveling direction.

Consequently, the snow removing machine 10 starts making a right spot turn about a turning center Gt (i.e., a center point, in front-and-rear and left-and-right directions, between the left and right crawlers 20L and 20R) with a turning radius Tr corresponding to a distance to a left corner of the auger housing 44.

FIG. 11B shows the snow removing machine 10 having made a right spot turn through about 90°. FIG. 11C shows the snow removing machine 10 having made a right spot turn through about 180°. From these figures, it can be seen that the turning area of the machine 10 falls within a circle of the turning radius Tr. The "spot turn" is intended to minimize the turning area of the machine 10 like this.

Namely, the snow removing machine 10 is allowed to start making a right spot turn in response to the human operator turning the rotational operating member 106 in the rightward (clockwise) direction Ri through a desired angle, and terminate the right spot turn in response to the human operator letting go of the rotational operating member 106. The snow removing machine 10 behaves similarly when making a left spot turn.

Figure 12:
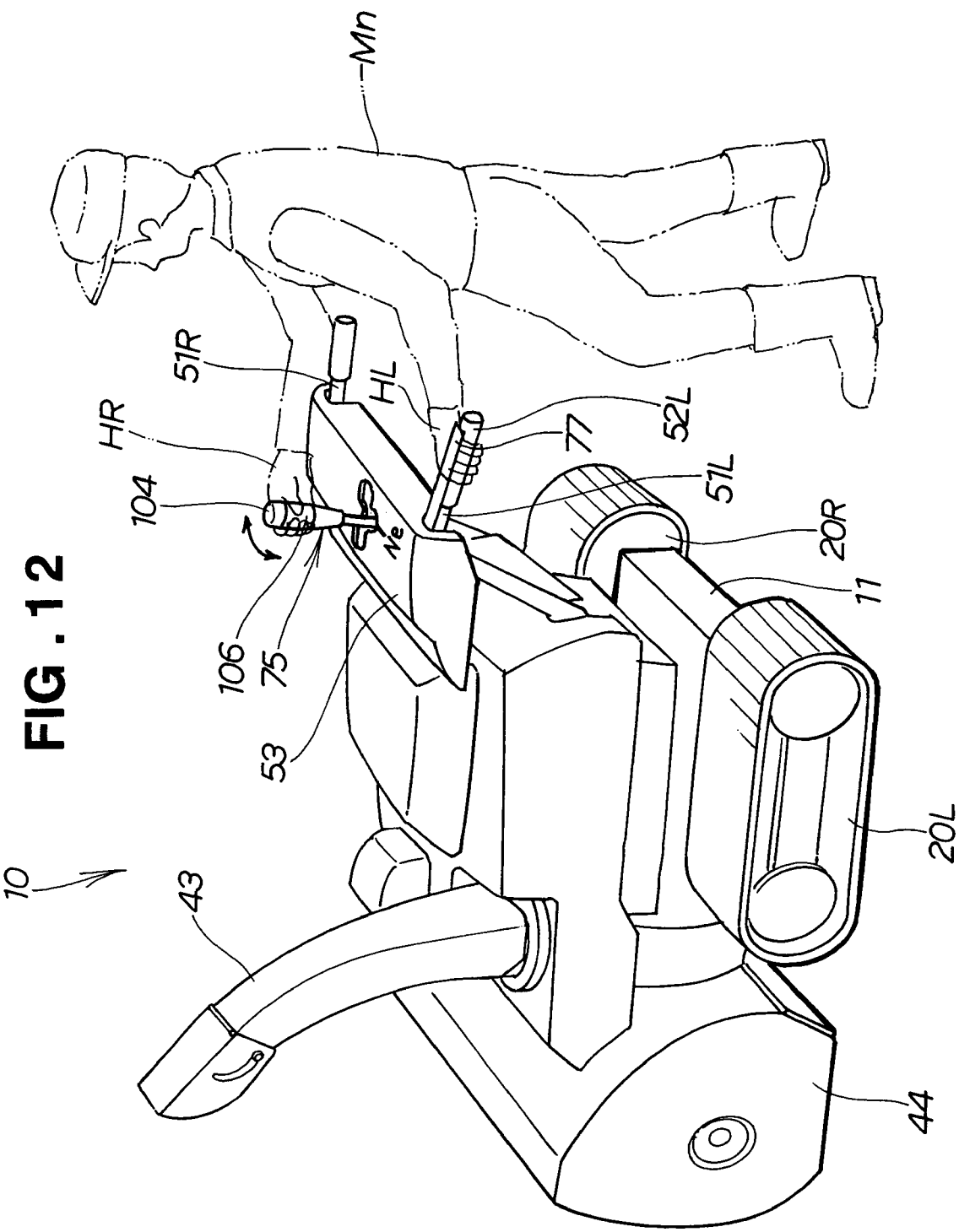
FIG. 12 is a view showing how a human operator manipulates the snow removing machine of the present invention in order to cause the machine to make a spot turn.
Figure 13A:
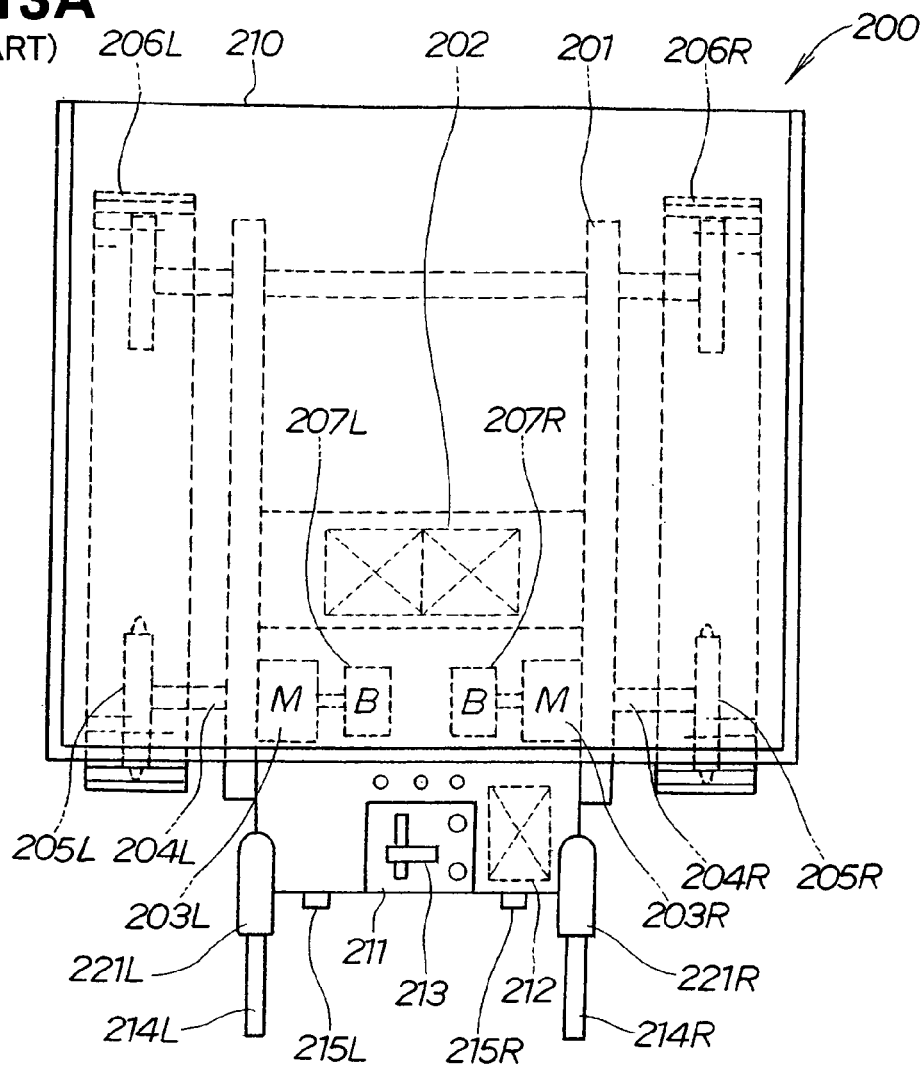
FIGS. 13A and 13B are views schematically showing construction and operation of a conventional electric vehicle.
Figure 13B:
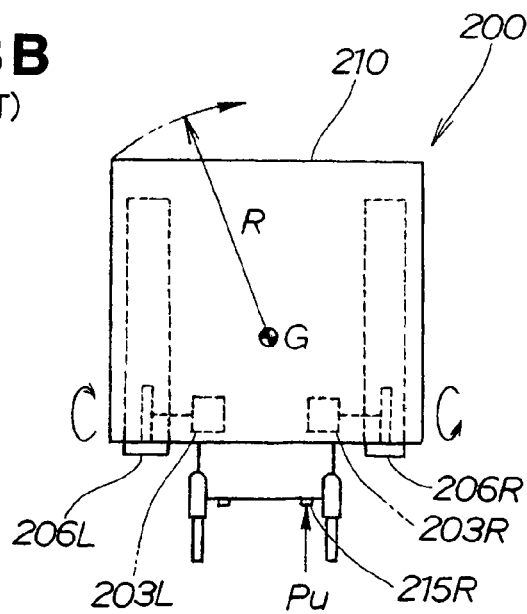

The following paragraphs describe operation by the human operator when causing the snow removing machine 10 to make a spot turn, with reference to FIGS. 6 and 12.

To cause the snow removing machine 10 to travel, the human operator Mn operates the machine 10 with one hand HR holing the direction/speed control lever (speed adjusting lever) 75 and the other hand HL holding the grip 52L of the operating handle 51L and travel preparation lever 77, as illustrated in FIG. 12. The human operator Mn can readily operate either one of the left and right spot-turn switches 130L and 130R (see FIG. 6) with the hand HR holding the speed adjusting lever 75, through effective manipulation of the speed adjusting lever 75 that is normally used most frequently during travel of the snow removing machine 10.

In this way, the human operator Mn can adjust the travel speed of the snow removing machine 10 by holding the speed adjusting lever 75 with the one hand HR, and, even when a left or right spot turn is to be made, the operator Mn can readily operate a desired one of the left and right spot-turn switches 130L and 130R without having to take the hand HR off the lever 75. In other words, the human operator Mn can use the same hand HR to perform both the speed adjusting operation and the spot-turning operation; especially, the human operator Mn can readily perform the spot-turning operation with no particular skill required. Thus, the instant embodiment of the present invention can significantly enhance the turning operability and usability of the snow removing machine 10. In addition, the instant embodiment car cause the machine 10 to make a spot turn in accordance with human operator's sense of turning operation. Because the left and right spot-turn switches 130L and 130R are provided on the speed adjusting lever 75, the instant embodiment can achieve significant aggregation of the component parts.

Further, the human operator can adjust the travel speed of the snow removing machine 10 by holding the grip 104 provided on the distal end portion of the lever body 101 of the speed adjusting lever 75. The snow removing machine 10 can make a left spot turn in response to the human operator extending his or her hand, holding the grip 104, to the rotational operating member 106 located immediately below the grip 104 and then turning the operating member 106 leftward to operate the left spot-turn switch 130L. Similarly, the snow removing machine 10 can make a right spot turn in response to the human operator extending the hand, holding the grip 104, to the rotational operating member 106 and then turning the operating member 106 rightward to operate the right spot-turn switch 130R. Then, as the human operator lets go of the rotational operating member 106 and holds the grip 104 alone, the rotational operating member 106 is automatically returned to the original neutral position via the automatic return mechanisms 120, so that the left and right spot-turn switches 130L and 130R are both brought the OFF state and thus the spot turn is terminated.

Because the human operator can adjust the travel speed of the snow removing machine 10 by holding the grip 104 of the speed adjusting lever 75 as noted above, the instant embodiment of the invention can secure sufficient operability for the travel speed adjustment. Also, because the instant embodiment allows the human operator to perform spot-turning operation by just extending his or her hand, holding the grip 104, to the rotational operating member 106 located immediately below the grip 104 and then turning the operating member 106 leftward or rightward, it can even further enhance the turning operability and usability of the snow removing machine 10. Furthermore, since the spot-turning operation can be performed by only turning the rotational operating member 106 in the direction where the snow removing machine 10 should turn, the desired spot turn can be made in accordance with human operator's ordinary sense of turning operation.

In addition, because the left and right spot-turn switches 130L and 130R and related components are provided in the vicinity of the grip 104 of the speed adjusting lever 75, the instant embodiment can achieve significant aggregation of the component parts.

Whereas the preferred embodiments of the invention have been described above in relation to the case where the electric vehicle is a working machine, such as a snow removing machine, the present invention is not so limited, and the electric vehicle may be of any desired type, such as electric truck vehicles, electric transport vehicles, electric golf carts, etc.

As apparent from the foregoing, the present invention is suited for use as snow removing machines, lawn mowers, electric truck vehicles, electric transport vehicles, electric golf carts, electric wheelchairs, etc. where left and right traveling units are driven via left and right electric motors, respectively.

Obviously, various minor changes and modifications of the present invention are possible in the light of the above teaching. It is therefore to be understood that within the scope of the appended claims the invention may be practiced otherwise than as specifically described.

What is claimed is:

1. An electric vehicle comprising:
   a machine body;
   an operation panel disposed on the machine body;
   first and second traveling units disposed on opposite sides of the machine body;
   first and second electric motors for driving the respective first and second traveling units;
   a speed adjusting lever disposed on the operation panel for adjusting a speed of the first and second traveling units, the speed adjusting lever comprising a first spot-turn switch operable to cause the first electric motor to rotate in a reverse direction and simultaneously cause the second electric motor to rotate in a forward direction, a second spot-turn switch operable to cause the second electric motor to rotate in the reverse direction and simultaneously cause the first electric motor to rotate in the forward direction, a lever body, a rotational operating member rotatably mounted on the lever body to undergo rotational movement in a first direction or in a second direction opposite to the first direction from a neutral position of the rotational operating member, a rotational-angle restriction mechanism that restricts a rotational angle of the rotational operating member, and an automatic return mechanism that automatically returns the rotational operating member to the neutral position upon removal of an operating force having turned the rotational operating member in the first direction or in the second direction from the neutral position;

speed adjustment means for generating a speed adjusting signal in response to operation of the speed adjusting lever; and a control unit for controlling rotation of the first and second electric motors in accordance with the speed adjusting signal generated by the speed adjustment means.

2. An electric vehicle according to claim 1;
wherein the speed adjusting lever further comprises a grip disposed on a distal end portion of the lever body; and
wherein the rotational operating member is located closer to a proximal end of the speed adjusting lever than the grip.

3. An electric vehicle according to claim 1;
wherein the speed adjusting lever further comprises a slide contact disposed on a surface of the rotational operating member and a base plate disposed on the lever body and having three fixed contacts on a surface thereof opposite to the slide contact.

4. An electric vehicle according to claim 3;
wherein the three fixed contacts comprise a first contact, a second contact and a third contact disposed between the first and second contacts; wherein the first contact, the third contact and the slide contact together form the first spot-turn switch; and wherein the second contact, the third contact and the slide contact together form the second spot-turn switch.

5. An electric vehicle according to claim 1;
wherein the speed adjusting lever further comprises a rotational-angle 'restriction mechanism for restricting a rotational angle of the rotational operating member, the rotational-angle restriction mechanism having a groove portion formed in an end surface of the rotational operating member and with a predetermined groove length along a rotational direction of the rotational operating member and having a projection fitting in the groove portion in such a manner that the groove portion can be displaced through a predetermined rotational angle along the rotational direction.

6. An electric vehicle according to claim 5;
wherein the speed adjusting lever further comprises a grip disposed on a distal end portion of the lever body; and
wherein the projection of the rotational-angle restriction mechanism is formed on one of the lever body and the grip.

7. An electric vehicle according to claim 1;
wherein the automatic return mechanism has a cam groove portion and an abutting member resiliently urged in abutting contact with the cam groove portion.

8. An electric vehicle according to claim 7;
wherein the speed adjusting lever further comprises a grip disposed on a distal end portion of the lever body; and
wherein one of the cam groove portion and the abutting member is disposed on an end surface of the rotational operating member and the other of the cam groove portion and the abutting member is disposed on the grip.

9. An electric vehicle comprising:
a machine body;
an operation panel disposed on the machine body;
left and right traveling units disposed on opposite sides of the machine body;
left and right electric motors for driving the left and right traveling units, respectively;
a speed adjusting lever disposed on the operation panel for adjusting a speed of the left and right traveling units, the speed adjusting lever comprising a left spot-turn switch operable to cause the left electric motor to rotate in a reverse direction and simultaneously cause the right electric motor to rotate in a forward direction, and a right spot-turn switch operable to cause the right electric motor to rotate in the reverse direction and simultaneously cause the left electric motor to rotate in the forward direction;
speed adjustment means for generating a speed adjusting signal in response to operation of the speed adjusting lever; and
a control unit for controlling rotation of the left and right electric motors in accordance with the speed adjusting signal generated by the speed adjustment means;
wherein the speed adjusting lever further comprises:
a grip provided on a distal end portion of a lever body;
a rotational operating member rotatably mounted on the lever body and located closer to a proximal end of the speed adjusting lever than the grip;
a rotational-angle restriction mechanism for restricting a rotational angle of the rotational operating member, the rotational-angle restriction mechanism having a groove portion formed in an end surface of the rotational operating member and having a predetermined groove length along a rotational direction of the rotational operating member, and having a projection formed on one of the lever body and the grip and fitting in the groove portion in such a manner that the groove portion can be displaced through a predetermined rotational angle along the rotational direction;
an automatic return mechanism for automatically returning the rotational operating member to a neutral position upon removal of an operating force having turned the rotational operating member leftward or rightward from the neutral position, the automatic return mechanism having a cam groove portion and an abutting member resiliently urged in abutting contact with the cam groove portion, one of the cam groove portion and the abutting member being disposed on an end surface of the rotational operating member and the other of the cam groove portion and the abutting member being disposed on the grip;
a slide contact disposed on a surface of the rotational operating member opposite to the grip; and
a fixed base plate disposed on the lever body and having three fixed contacts on a surface thereof opposite to the slide contact, the three fixed contacts comprising a middle, neutral contact, a left contact located to an immediate left of the neutral contact, and a right contact located to an immediate right of the neutral contact, the neutral contact, the left contact and the slide contact together forming the left spot-turn switch, and the neutral contact, the right contact and the slide contact together forming the right spot-turn switch.

* * * * *